(12) United States Patent
Weintraub

(10) Patent No.: US 11,054,050 B2
(45) Date of Patent: Jul. 6, 2021

(54) VALVE WITH PRESS-FIT INSERT

(71) Applicant: Proserv Operations, Inc., Houston, TX (US)

(72) Inventor: Preston Weintraub, Spring, TX (US)

(73) Assignee: PROSERV OPERATIONS INC., Houston, TX (US)

( * ) Notice: Subject to any disclaimer, the term of this patent is extended or adjusted under 35 U.S.C. 154(b) by 0 days.

(21) Appl. No.: 16/530,637

(22) Filed: Aug. 2, 2019

(65) Prior Publication Data

US 2020/0049270 A1 Feb. 13, 2020

Related U.S. Application Data

(60) Provisional application No. 62/718,292, filed on Aug. 13, 2018.

(51) Int. Cl.
*F16K 25/00* (2006.01)
*F16K 3/316* (2006.01)

(52) U.S. Cl.
CPC ............ *F16K 25/005* (2013.01); *F16K 3/316* (2013.01)

(58) Field of Classification Search
CPC .... F16K 25/005; F16K 3/0236; F16K 3/0263; F16K 3/316; F16K 11/0655; F16K 31/0668; E21B 34/16; E21B 34/04; F16J 15/062
See application file for complete search history.

(56) References Cited

U.S. PATENT DOCUMENTS

| 402,600 | A | 5/1889 | Kemp |
|---|---|---|---|
| 1,654,642 | A | 1/1928 | Geissinger |
| 2,140,735 | A | 12/1938 | Gross |
| 2,311,851 | A | 2/1943 | McClure |
| 2,560,841 | A | 7/1951 | Bishop |
| 2,605,108 | A | 7/1952 | Stephens |
| 2,685,296 | A | 8/1954 | Boosman |
| 2,729,226 | A | 1/1956 | Jones |
| 2,799,523 | A | 7/1957 | Parker |
| 2,811,979 | A | 11/1957 | Presnell |
| 2,821,972 | A | 2/1958 | Banker |
| 2,847,027 | A | 8/1958 | Kumpman |
| 2,862,520 | A | 12/1958 | Cordova |
| 2,867,463 | A | 1/1959 | Snider |

(Continued)

FOREIGN PATENT DOCUMENTS

| CH | 469928 A | 3/1969 |
|---|---|---|
| DE | 102014224979 A1 | 6/2016 |

OTHER PUBLICATIONS

PCT International Search Report and Written Opinion dated Nov. 14, 2019, for International Application No. PCT/US2019/046323, 13 pages.

(Continued)

*Primary Examiner* — Matthew W Jellett
(74) *Attorney, Agent, or Firm* — Patterson + Sheridan, LLP

(57) ABSTRACT

A shear seal includes a seal plate having a first seal surface and a sliding seal assembly having a second seal surface, and at least one of the first and second sealing surfaces comprise an insert comprising a material different than that of the seal plate or the sliding seal connected to the seal plate or sliding seal assembly by a compressed member disposed between the insert and the adjacent surface of seal plate or sliding seal assembly.

20 Claims, 19 Drawing Sheets

(56) References Cited

U.S. PATENT DOCUMENTS

| | | | |
|---|---|---|---|
| 2,892,644 A | 6/1959 | Collins | |
| 2,906,290 A | 9/1959 | Harding et al. | |
| 2,973,746 A | 3/1961 | Jupa | |
| 3,022,794 A | 2/1962 | Pippenger | |
| 3,114,391 A | 12/1963 | Kurtz | |
| 3,145,723 A | 8/1964 | Chorkey | |
| 3,189,049 A | 6/1965 | Carlson | |
| 3,219,060 A | 11/1965 | Pearl et al. | |
| 3,225,786 A | 12/1965 | Elliott | |
| 3,279,805 A | 10/1966 | Quinson | |
| 3,316,930 A | 5/1967 | Garduer | |
| 3,352,394 A | 11/1967 | Longshore | |
| 3,421,533 A | 1/1969 | Conn | |
| 3,474,828 A | 10/1969 | Wheeler et al. | |
| 3,485,225 A | 12/1969 | Bailey et al. | |
| 3,533,431 A | 10/1970 | Kuenzel et al. | |
| 3,536,085 A | 10/1970 | Taplin | |
| 3,540,695 A | 11/1970 | Taylor | |
| 3,587,647 A | 6/1971 | Walters | |
| 3,598,148 A | 8/1971 | Kroffke | |
| 3,635,436 A | 1/1972 | Tillman | |
| 3,662,950 A | 5/1972 | McIntosh et al. | |
| 3,683,694 A | 8/1972 | Granberg | |
| 3,749,122 A | 7/1973 | Gold | |
| 3,797,525 A | 3/1974 | Lieser | |
| 3,913,620 A | 10/1975 | Pauliukonis | |
| 3,949,645 A | 4/1976 | Masclet | |
| 3,978,888 A * | 9/1976 | Naono | G01N 35/00 |
| | | | 137/625.19 |
| 4,220,174 A | 9/1980 | Spitz | |
| 4,240,634 A | 12/1980 | Wiczer | |
| 4,253,481 A | 3/1981 | Sarlls, Jr. | |
| 4,263,938 A | 4/1981 | Peters | |
| 4,281,677 A | 8/1981 | Hoffman | |
| 4,336,946 A | 6/1982 | Wheeler | |
| 4,396,071 A | 8/1983 | Stephens | |
| 4,444,216 A | 4/1984 | Loup | |
| 4,475,568 A | 10/1984 | Loup | |
| 4,491,154 A | 1/1985 | Peters | |
| 4,493,335 A | 1/1985 | Watson | |
| 4,554,940 A | 11/1985 | Loup | |
| 4,793,590 A | 12/1988 | Watson | |
| 4,856,557 A | 8/1989 | Watson | |
| 4,877,057 A | 10/1989 | Christensen | |
| 4,890,645 A | 1/1990 | Andersen | |
| 4,968,197 A | 11/1990 | Chen | |
| 5,035,265 A | 7/1991 | Chen | |
| 5,069,240 A | 12/1991 | Kurkjian, Jr. | |
| 5,190,078 A | 3/1993 | Stoll et al. | |
| 5,222,521 A | 6/1993 | Kihlberg | |
| 5,301,637 A | 4/1994 | Blount | |
| 5,771,931 A | 6/1998 | Watson | |
| 5,797,431 A | 8/1998 | Adams | |
| 5,901,749 A | 5/1999 | Watson | |
| 6,041,804 A | 3/2000 | Chatufale | |
| 6,257,268 B1 | 7/2001 | Hope et al. | |
| 6,264,206 B1 | 7/2001 | Hashizawa et al. | |
| 6,296,008 B1 | 10/2001 | Boyer et al. | |
| 6,318,400 B1 | 11/2001 | Hope et al. | |
| 6,382,256 B2 | 5/2002 | Kim et al. | |
| 6,443,174 B2 * | 9/2002 | Mudd | G01F 1/6842 |
| | | | 137/10 |
| 6,520,478 B1 | 2/2003 | Hope et al. | |
| 6,523,613 B2 | 2/2003 | Rayssiguier et al. | |
| 6,651,696 B2 | 11/2003 | Hope et al. | |
| 6,668,861 B2 | 12/2003 | Williams | |
| 6,702,024 B2 | 3/2004 | Neugebauer | |
| 6,843,266 B2 | 1/2005 | Hope et al. | |
| 6,901,960 B2 | 6/2005 | Roberts et al. | |
| 6,983,803 B2 | 1/2006 | Watson et al. | |
| 7,000,890 B2 | 2/2006 | Bell et al. | |
| 7,073,590 B2 | 7/2006 | Neugebauer et al. | |
| 7,159,605 B2 | 1/2007 | Thrash, Jr. et al. | |
| 7,438,086 B2 | 10/2008 | Bento et al. | |
| 7,520,297 B2 | 4/2009 | Bell et al. | |
| 7,628,170 B2 | 12/2009 | Kok-Hiong et al. | |
| 7,784,553 B2 | 8/2010 | Moreno | |
| 7,959,161 B2 | 6/2011 | Seki et al. | |
| 8,052,119 B2 | 11/2011 | Numazaki et al. | |
| 8,245,729 B2 | 8/2012 | Zub | |
| 8,246,055 B2 | 8/2012 | Asplund et al. | |
| 8,342,202 B2 | 1/2013 | Nishio et al. | |
| 8,397,742 B2 | 3/2013 | Thrash et al. | |
| 8,408,244 B2 | 4/2013 | Gilcher | |
| 8,453,678 B2 | 6/2013 | Neff et al. | |
| 8,469,059 B1 | 6/2013 | Forst | |
| 8,474,792 B2 | 7/2013 | Kubo et al. | |
| 9,121,244 B2 | 9/2015 | Loretz et al. | |
| 9,297,462 B2 | 3/2016 | Hattori et al. | |
| 9,334,946 B1 | 5/2016 | Mason | |
| 9,354,638 B2 | 5/2016 | Rebreanu et al. | |
| 9,423,031 B2 | 8/2016 | Weintraub et al. | |
| 9,874,282 B2 | 1/2018 | Wetzel et al. | |
| 2004/0047748 A1 | 3/2004 | Roberts et al. | |
| 2004/0173976 A1 | 9/2004 | Boggs | |
| 2004/0262007 A1 | 12/2004 | Neugebauer et al. | |
| 2005/0028864 A1 | 2/2005 | Thrash et al. | |
| 2005/0067031 A1 | 3/2005 | Lee | |
| 2006/0137744 A1 | 6/2006 | Anastas | |
| 2006/0237064 A1 | 10/2006 | Benson | |
| 2007/0000544 A1 | 1/2007 | Thompson | |
| 2007/0069576 A1 | 3/2007 | Suzuki | |
| 2007/0113906 A1 | 5/2007 | Sturman et al. | |
| 2010/0044605 A1 | 2/2010 | Veilleux | |
| 2010/0140881 A1 | 6/2010 | Matsuo | |
| 2010/0154896 A1 | 6/2010 | Thrash, Jr. et al. | |
| 2010/0243084 A1 | 9/2010 | Yoshioka et al. | |
| 2011/0253240 A1 | 10/2011 | Otto et al. | |
| 2012/0292550 A1 | 11/2012 | Meek | |
| 2013/0032222 A1 | 2/2013 | Bresnahan | |
| 2013/0037736 A1 | 2/2013 | Bresnahan | |
| 2013/0146303 A1 | 6/2013 | Gustafson | |
| 2013/0181154 A1 | 7/2013 | Robison et al. | |
| 2014/0116551 A1 | 5/2014 | Smith | |
| 2014/0377111 A1 | 12/2014 | Bagagli et al. | |
| 2015/0060715 A1 | 3/2015 | Hoang | |
| 2015/0152959 A1 | 6/2015 | Mangiagli et al. | |
| 2015/0191996 A1 | 7/2015 | Weintraub | |
| 2015/0191997 A1 | 7/2015 | Weintraub et al. | |
| 2015/0276072 A1 | 10/2015 | Rebreanu et al. | |
| 2015/0276083 A1 | 10/2015 | Druhan et al. | |
| 2015/0369002 A1 | 12/2015 | Patterson | |
| 2016/0103456 A1 | 4/2016 | Cho et al. | |
| 2016/0123478 A1 | 5/2016 | Wetzel et al. | |
| 2016/0230900 A1 | 8/2016 | Schulz et al. | |
| 2016/0258531 A1 | 9/2016 | Ito et al. | |
| 2016/0258537 A1 | 9/2016 | Heiderman et al. | |
| 2017/0037984 A1 | 2/2017 | Frippiat et al. | |
| 2017/0097100 A1 | 4/2017 | Patterson | |
| 2017/0175916 A1 | 6/2017 | Huynh et al. | |
| 2017/0189730 A1 | 7/2017 | Ernfjall | |
| 2017/0220054 A1 | 8/2017 | Zhu et al. | |
| 2017/0241563 A1 | 8/2017 | Simpson | |
| 2017/0260831 A1 | 9/2017 | Green | |
| 2017/0314689 A1 | 11/2017 | Osterbrink et al. | |
| 2017/0370481 A1 | 12/2017 | Glazewski | |
| 2018/0073652 A1 | 3/2018 | Weintraub | |

OTHER PUBLICATIONS

PCT International Search Report and Written Opinion dated Dec. 1, 2017, for International Application No. PCT/US2017/061567.
PCT International Search Report and Written Opinion dated Jan. 31, 2018, for International Application No. PCT/US2017/051550.
PCT International Search Report and Written Opinion dated Jun. 23, 2015, for International Application No. PCT/US2014/062114.
India Patent Application No. 202137010322, Examination Report dated May 6, 2021, 6 pages.

\* cited by examiner

VALVE WITH PRESS-FIT INSERT

CROSS-REFERENCE TO RELATED APPLICATIONS

This application claims benefit of U.S. provisional patent application Ser. No. 62/718,292, filed Aug. 13, 2018, which is herein incorporated by reference.

BACKGROUND

Field

The present disclosure relates to the field of fluid control components. More particularly, the present disclosure relates to the field of hydraulic valves and regulators used to control fluid operated devices, such as other valves and components in fluid circuits, including valves and components used to operate oilfield well drilling and production equipment, such as surface and subsea blowout preventers.

Description of the Related Art

Hydraulic valves are used to control the opening and closing of hydraulically operated oilfield well drilling and production equipment, such as additional valves or other components connected to blowout preventers, as well as valves used in process control in other industries, such as food handling equipment, machining equipment, and other industries. Fluid regulators are used to control the pressure in a hydraulic circuit to ameliorate pressure spikes which can occur when hydraulic valves in the circuit are opened or closed. Variable orifices are used to selectively pass pressure and fluid therethrough at levels between full fluid flow and pressure and no fluid flow and pressure, and thus regulate the fluid pressure downstream therefrom. Pressure regulators are used to maintain a desired pressure in a hydraulic control circuit. Pressure relief valves are configured to relieve an overpressure condition in a fluid line by allowing a portion of the fluid therein to vent from the fluid line. These fluid based control circuit components are commonly provided in a fluid control circuit with redundancy, i.e., more than one set of valves, regulators, etc. are provided for any critical function the control circuit is configured to perform to ensure, that when required to for example operate a blowout preventer to close off a well bore being drilled or operated upon, the hydraulic control circuit will deliver the required fluid in the required time with sufficient volume and pressure to close the blowout preventer.

One recurring limitation in hydraulic valves and regulators which use pressurized fluid or an electromechanical actuator to cause at least one valve component to move with respect to another valve component is stiction, which is the static friction present between two stationary surfaces in contact with one another. Typically, the force needed to overcome stiction to allow one surface to move with respect to the other is greater than the force needed to cause two surfaces in contact with each other to continue moving with respect to each other once movement therebetween has started. As a result, it is known in the art that up to 20% of the total force, and thus of the total energy, supplied to a hydraulic valve can be taken up to overcome stiction, which resultantly causes the mechanical valve elements overshoot their intended locations. In a regulator, where dead bands on the order of 20 to 30% are known to occur in current designs, hunting, or oscillating around the outlet pressure setpoint, is a continuing issue affecting the operation of the hydraulic circuit. Pressure oscillations in the line valve on the order of 1400 psi decreases and 600 psi increases are known to occur when a valve closing off, i.e., blocking, fluid communication with the line is opened.

An additional issue present in hydraulic circuit control components is reliability of the hydraulic control components due to wear and corrosion of the components, caused by the exposure of the components to erosive and corrosive hydraulic operating fluids, and by relative movement of the components with respect to each other. Corrosion and erosion of the parts of the hydraulic circuit control components moving relative to one another or relative to other parts can generate debris tending to cause these components to become locked in place, or move erratically, and corrosion, erosion and wear can cause a slidable interface between components to leak, reducing the effectiveness and reliability of the hydraulic control circuit component. Upon the occurrence of either event, the hydraulic circuit component will require repair or replacement, which in a subsea environment is expensive where servicing of the components often requires the use of a submersible robot to remove or service a hydraulic circuit component. To prevent the hydraulic control circuit from becoming non-functional as a result of a failure of a hydraulic control component, and to reduce the number of service operation periods in which a submersible robot is used to replace hydraulic control components, subsea control systems often have even greater redundancy requiring even more redundant hydraulic circuits and attendant components including redundant valves, regulators and variable orifices, leading to even greater cost of the hydraulic control circuitry.

To help reduce wear, the hydraulic control circuit components which include sliding contact surfaces have been made from, or coated with, carbide materials. However, relatively high stiction occurs between two closely fitted, but slidingly movable with respect to each other, carbide surfaces. As a result, to operate these hydraulic circuits, fluid maintained at relatively high pressures is required. A substantial amount of energy is used to pressurize the fluid, and large accumulators are needed to store the fluid under the high pressure. Because of the need for redundant components systems, these costs are magnified where stiction is a large factor in the operational energy needed to operate the valve.

Additionally, because carbide based components are brittle in comparison to stainless steel components, where two such parts of a component must be moved into sealing engagement, slower component velocities resulting in lower engagement forces are used to ensure the components do not fracture, crack or create particles thereof which can become lodged between the moving surfaces and lock the moving parts in place. As a result, valve operation slower than optimal occurs, i.e., the time to close off or open a flow passage, or otherwise effect the fluid flow, pressure or both in a fluid flow line or component being controlled by the hydraulic control circuit is greater than that desired. Additionally, carbide materials are difficult to machine, and thus if an valve component is manufactured out of a carbide blank, it can break or chip during the manufacture thereof, resulting in significant net cost of each useful carbide component as a percentage of all carbide parts machined or manufactured.

As a result of the stiction issues of sliding stainless steel surfaces, and the limitations on the performance of carbide materials, the applicant hereof has developed valves wherein the relative sliding surfaces forming the sealing interface of the valve have been constructed using inserts of non-ferrous metal single crystal materials such as sapphire, or carbide materials, as one or both of the sealing surfaces. As described in applicant's prior U.S. patent application Ser. No. 15/705,013, filed Sep. 14, 2017, the relative sliding surfaces may be formed on inserts which are eutectic bonded to the underlying stainless steel valve component. However, even using inserts of single crystal materials, as well as inserts of carbide materials, as the sliding seal, i.e., forming a shear seal therewith, components, high manufacturing cost and insert breakage continues to occur at an unacceptably high level, resulting in high cost, risk of failure of the insert by fracturing in use, and thus a low acceptance of such valves including single crystal or carbide surfaces provided as an insert material. Additionally, where inserts are single crystal and are welded to a valve component, any slight misalignment therebetween is difficult to fix after the single crystal insert piece and valve component are fixed together by welding, and this misalignment can result in the opposing sealing surfaces being in a non-parallel state, i.e., one is cocked slightly with respect to the other, and when the valve is in a closed position, a point contact between the sealing components can occur, and a gap is thus formed adjacent thereto and the intended sealing interface leaks. Additionally, because the single crystal materials are highly wear resistant, the sealing faces of the valve will not "run in" so that the facing relatively sliding surfaces wear into an aligned state, and the point contact may chip or crack, causing the valve to potentially become locked in an open, closed, or intermediate state.

SUMMARY

Embodiments herein provide a lower friction and higher wear and corrosion resistance sliding interface for hydraulic component sliding interfaces, such as sealing surfaces. In one aspect, a shear seal includes a seal plate having a first seal surface and a sliding seal assembly having a second seal surface, and at least one of the first and second sealing surfaces comprise an insert comprising a material different than that of the seal plate or the sliding seal connected to the seal plate or sliding seal assembly by a compressed member disposed between the insert and the adjacent surface of seal plate or sliding seal assembly.

In another aspect, the single crystal material can be sapphire or ruby, and one sliding surface can comprise ruby, and the other sapphire, either as a coating, an insert, or the composition of the entire part.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Herein, hydraulic operating valves, regulators and other hydraulic control circuit components are configured wherein at least one of the internal components thereof which move relative to one another or engage one another are configured of a non-ferrous single crystal material, such as ruby or sapphire, and as a result lower friction sliding interfaces, less component wear, and a reduction in the wear and corrosion of these components are achieved. Alternatively, hydraulic operating valves, regulators and other hydraulic control circuit components are configured wherein at least one of the internal components thereof which move relative to one another or engage one another are configured of a carbide material, and as a result, less component wear, and a reduction in the wear and corrosion of these components, is achieved. In contrast to prior valves where single crystal materials are provided as a separate sealing disk or related component welded in place, or components formed entirely of carbide, or a carbide sealing disk or related component is welded to a valve component, or a carbide coating is applied, here the carbide or single crystal materials are provided as insets which are press fit into place. The press fit connection of the single crystal or carbide piece having a sealing surface of the valve thereon into or on a valve component, includes a conformable intermediary between the single crystal or carbide element and the sealing element. This allows the single crystal or carbide element to move to a small degree within, or on, the valve component, thereby allowing the opposed sealing surfaces to move with respect to each other and come into a parallel alignment needed for proper sealing operation. Descriptions of applications of the non-ferrous single crystal material in a number of selected hydraulic circuit control components are provided herein. While not exhaustive of the applicability of the single crystal material, they are intended to provide exemplars of use of the single crystal material and not to limit the scope of the invention described herein. Additionally herein, the sealing elements of the valve operate as a shear seal, where at least one seal component has an opening therein that is selectively allowed to communicate with an inlet or outlet of the valve, by operation of the other sealing component to move over the opening, or retract from being over the opening, by relative sliding motion thereof across the other element thereof.

Figure 1:
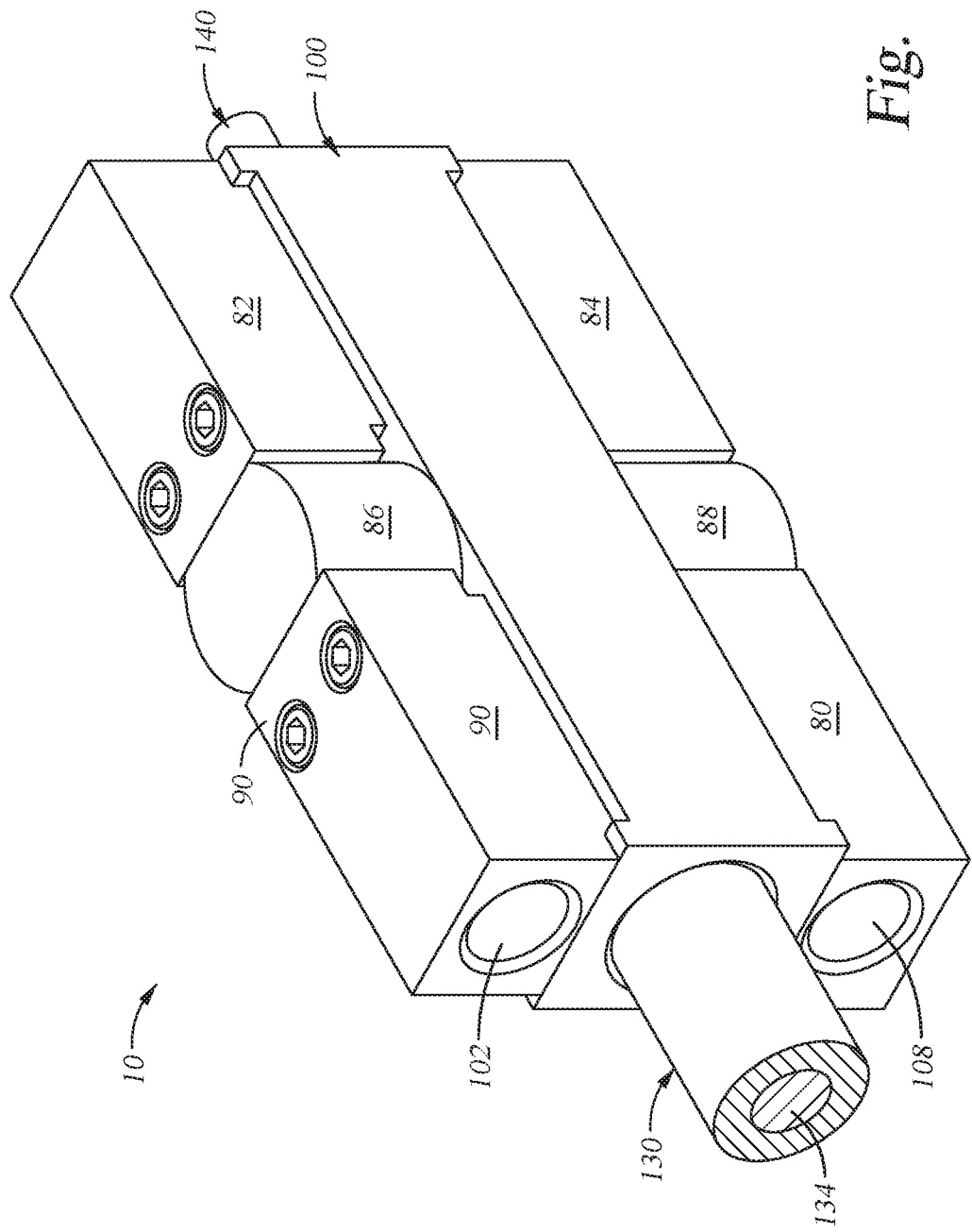
FIG. 1 is an isometric view of a modular valve, including a shear seal as a sealing element thereof.

Referring initially to FIG. 1, an isometric view of a modular valve 10 is shown, wherein a plurality of functional blocks, including a supply block 90, a dummy block 82, a first function block 80 and a second function block 84, are interconnected through first and second adaptor blocks 86, 88, to a valve block 100 within which a sliding seal assembly, including a sleeved insert, is provided. Herein, a single crystal or carbide material is employed as the sliding seal interface material and is provided as an insert, which is not connected to the valve component on or within which it is located by a physically rigid connection. For example, the insert is not connected to the valve component using welding, soldering, non-compliant, when cured or set, adhesives, or the like, but is instead connected to the valve component by being press fit thereover using an intermediate sleeve, wherein the sleeve is preferably compressed, but not sheared, during the press fitting operation, and the sleeve is compressed such that in compression, is provides sufficient force against the adjacent surfaces of the insert and the sleeve to provide sufficient friction therebetween to prevent the sleeve or the insert from backing off or out of its press fit location. Additionally, in use, at least portions of the sealing insert and an adjacent seal surface, here preferably another insert, are always biased toward one another, and hence the sealing inserts are biased in a direction to maintain them in their press fit location. The sleeve also functions, to a degree, as a compliant interface between the sealing insert and the seal component it is held in or on, and thus allows some change in the attitude of the sealing face of the insert with respect to the seal component, allowing the sealing surfaces to move into parallel alignment where a slight misalignment from parallel would in the past have resulted in breakage or cracking of the insert and the need to replace the valve.

Figure 2:
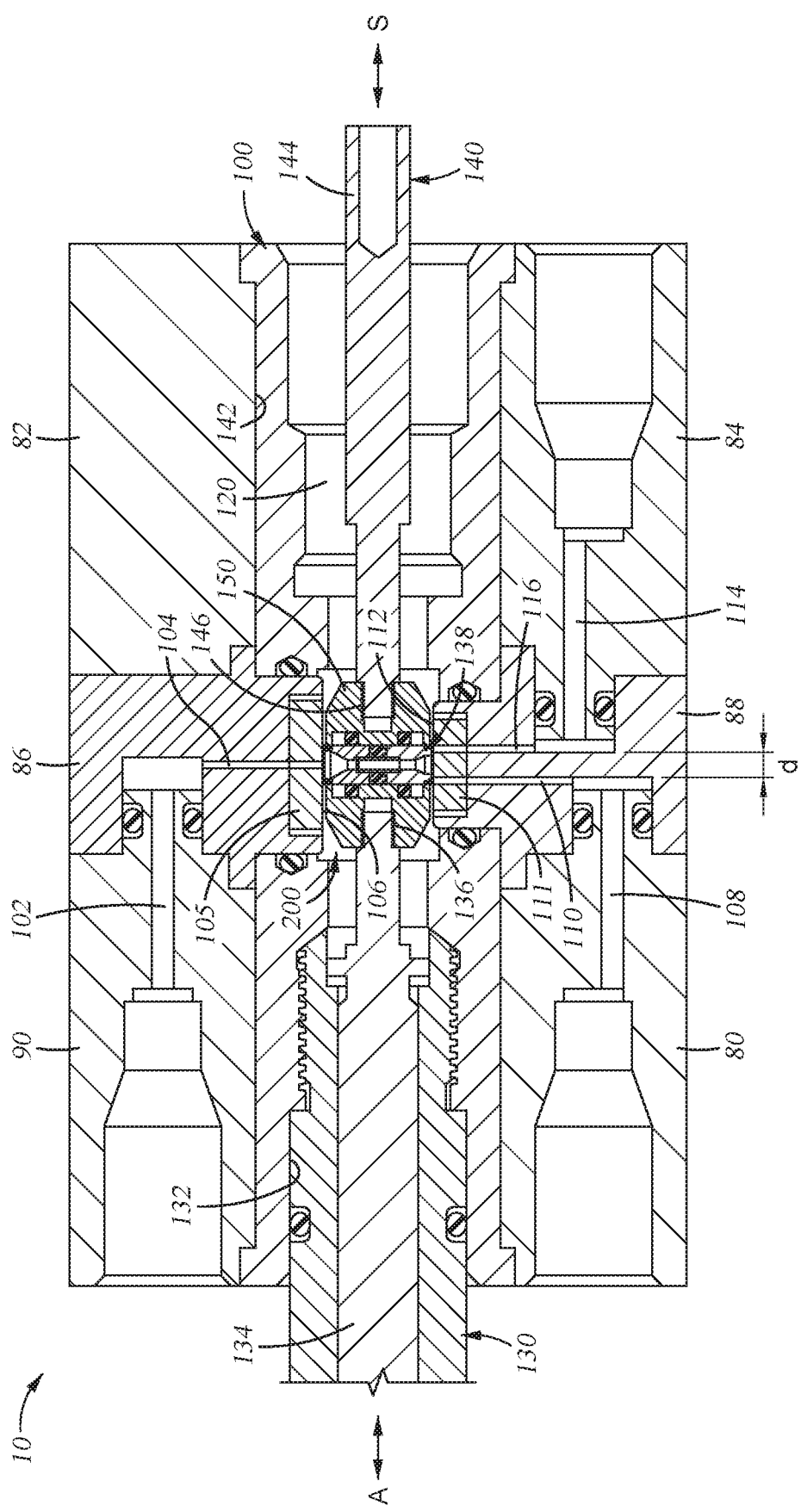
FIG. 2 is a sectional view of a shear seal style valve.
Figure 3:
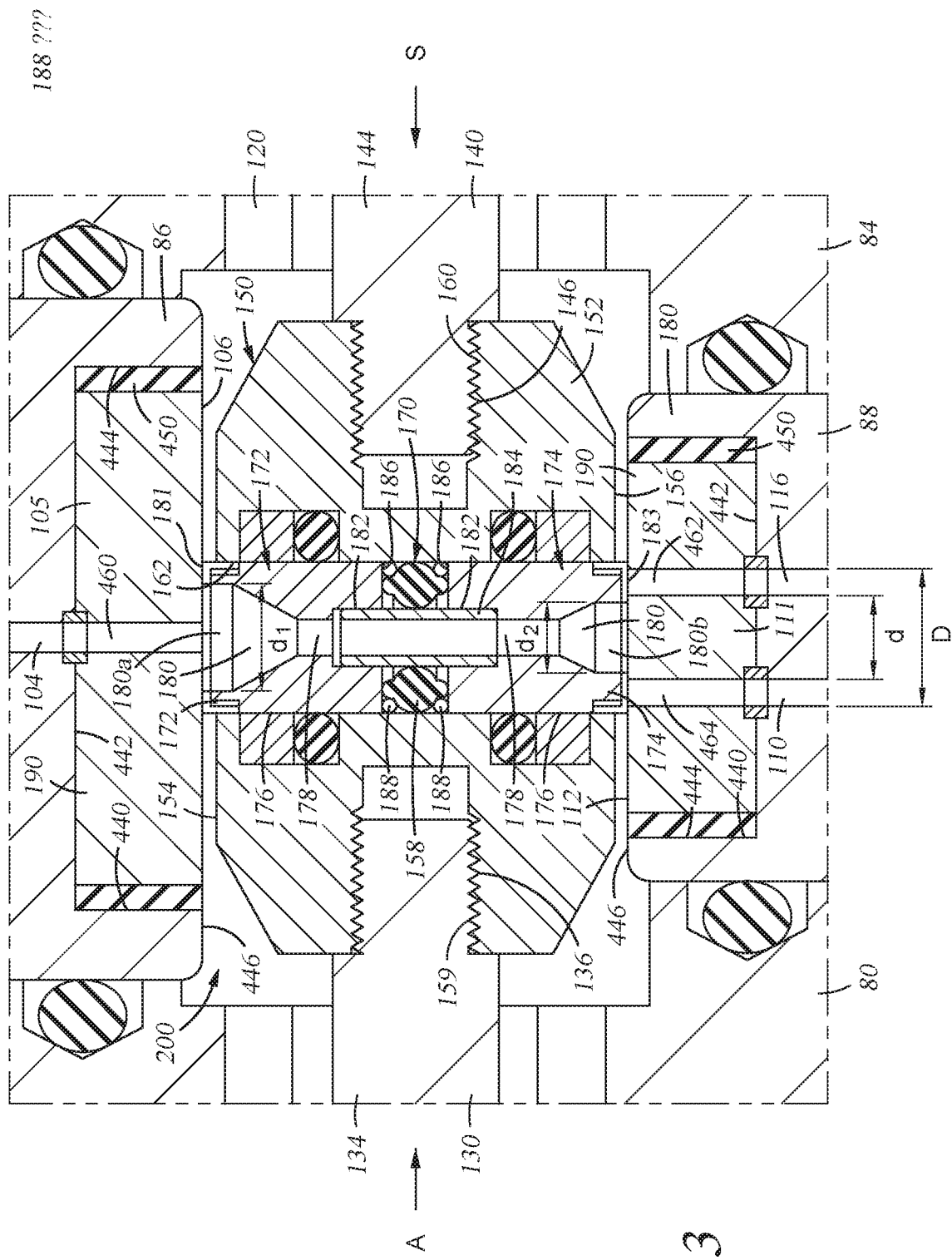
FIG. 3 is an enlarged view of a portion of FIG. 2, showing the seal carrier and sealing elements in greater detail.
Figure 4:
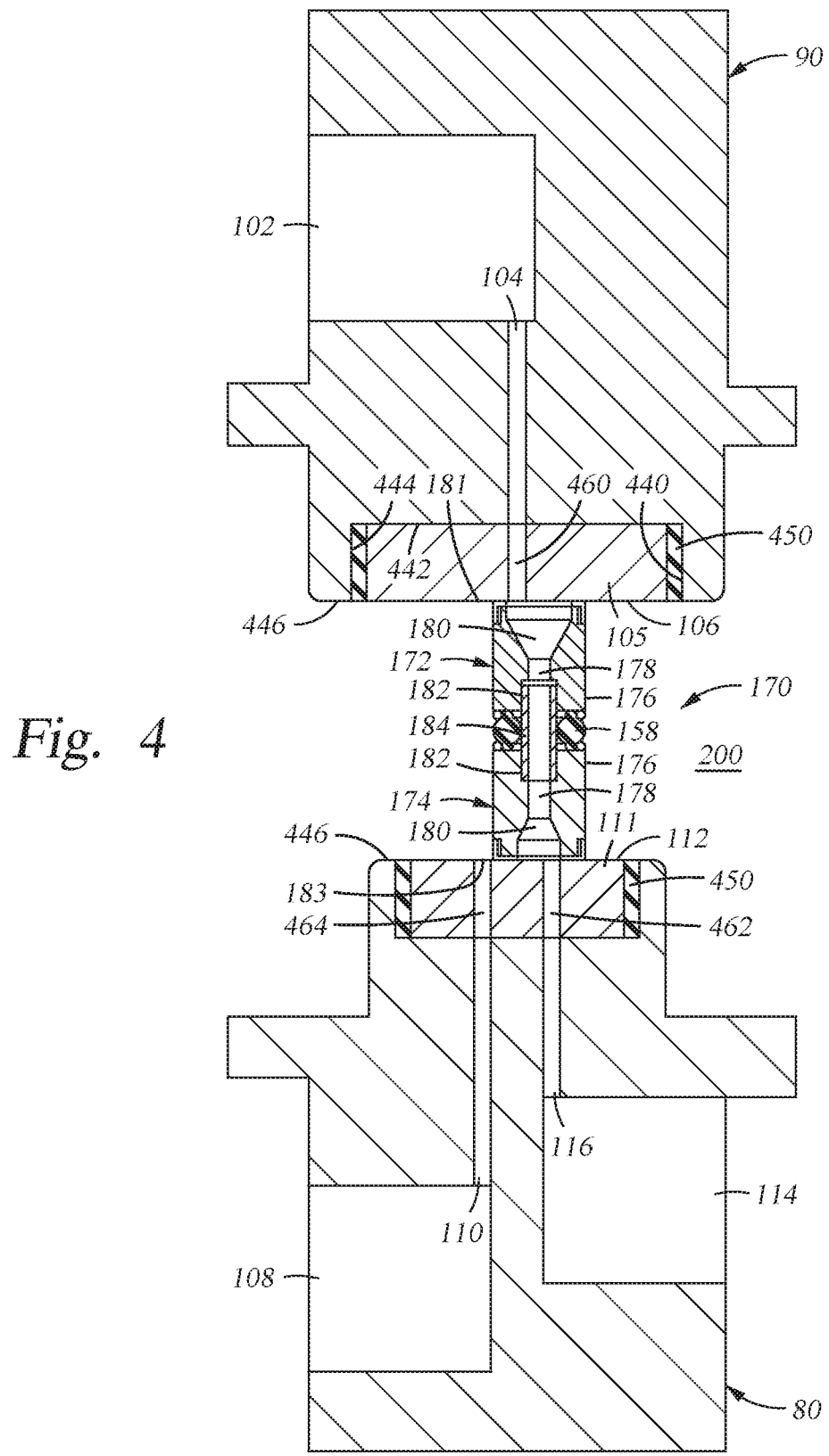
FIG. 4 is a sectional view of a bidirectional seal assembly and opposed seal plate assemblies wherein the bidirectional seal assembly blocks the outlet passages of the valve.

Referring to FIGS. 2 to 4, the portion of the valve of FIG. 1, having the sealing interfaces thereof, is shown in section and here is configured as a four way, two position valve 10, wherein certain internal components thereof are configured from, or include inserts configured from, a single crystal material such as ruby or sapphire, or a carbide material. In FIG. 4, the valve components that form the sealing and fluid path switching are shown in section, without adjacent portions of the accompanying valve body and attendant operational elements of the valve.

The valve of FIGS. 2 to 4 comprises a valve block 100 forming the valve body, an inlet block 90, and outlet block 80, a drive actuator 130, a compensation or return actuator 140, and a seal carrier 150. A shear seal assembly 138 is provided in the seal carrier 150. The valve block 100 is configured of stainless steel or other high strength metal, and connected thereto are first adaptor block 86 and the inlet body 90 having an inlet 102 ported, through an inlet body passage 104 in the first adaptor block 86, to a first seal plate 105 having a sealing surface 106 through which the inlet body passage 104 communicates, and the second adaptor block 88 and the first outlet block 80 connected thereto having a first outlet passage 108 communicating through a first outlet block passage 110 to a second seal plate 111 having a second sealing surface 112 through which the first outlet block passage 110 communicates, and the second outlet block 86, having a second outlet 114 connected through a second outlet block passage 116 to the second seal plate 111 second sealing surface 112, through which second outlet block passage 116 opens. Inlet block passage 104 intersects first seal plate sealing surface 106 generally perpendicular to the planar surface thereof, and each of the first and second outlet block passages 110, 116 intersect the second seal plate sealing surface 112 generally perpendicular thereto. The first and second outlet block passages 110, 116 are spaced from each other at the second seal plate surface 112 by a distance d (FIG. 3).

Body 100 further includes a cross bore 120 extending therethrough generally perpendicular to the portions of the inlet body passage 104 and the first and second outlet block passages 110, 116 opening into the seal plate surfaces 106, 112. The drive actuator 130 extends inwardly of a first opening 132 of the cross bore 120 and thus into the valve block 100, and includes a drive rod 134 terminating inwardly of the body 100 in a threaded boss 136. An actuator, such as a mechanical or electromechanical drive, to push the drive rod 134 inwardly of the opening 132, is shown schematically as the force arrow "A". Additionally, the actuator may be a hydraulically operated piston. The compensation actuator 140 extends inwardly of the second opening 142 of the cross bore 120 into the valve block 100. Compensation actuator 140 includes a compensation drive rod 144 which terminates inwardly of the valve block 100 in a threaded compensation rod boss 146. In the embodiment, a spring, not shown but schematically represented by force arrow S, provides a return force to re-center the carrier 150 in the valve 10 between the seal plate surfaces 106, 112.

Referring to FIG. 3, the seal carrier 150 is shown in section and enlarged, and includes a body 152 having opposed, parallely disposed, upper and lower surfaces 154, 156, a threaded drive rod opening 159 into which the threaded boss 136 of the drive rod is threadingly secured, and an opposed threaded compensation rod boss opening 160, into which the treaded compensation rod boss 146 is threadingly received. A seal bore 162 extends through the carrier 150 and opens through the upper and lower surfaces 154, 156.

As shown best in FIG. 3, bidirectional seal assembly 170 is received within the generally right cylindrical, in section, seal bore 162 extending through the seal carrier 150 and includes a first sealing element 172 located adjacent to the upper surface 154 of the seal carrier 150, a second sealing element 174 located adjacent to the lower surface 156 of the seal carrier, and a biasing element 158 interposed between the first and second sealing elements in the seal bore 162, and configured to bias the sealing elements 172, 174 outwardly of the upper and lower surfaces 154, 156 of the seal carrier 150, respectively. Each of the first and second sealing elements 172, 174 have a generally right cylindrical outer surface 176 and a bore 178 therethrough opening, at the first or second ends thereof, respectively, in an outwardly tapered countersink opening 180. The bore 178 opens, at the end thereof opposite to countersunk opening 180, into an enlarged diameter counter bore 182, such that the counterbores 182 of each sealing element 172, 174 face each other within the seal bore 162. An alignment tube 184 extends inwardly of the opposed counterbores 182 to maintain alignment between the two sealing elements 172, 174 and form a continuous flow passage between the bores 178 thereof and thus through the seal bore 162. A small clearance gap, on the order of 1 to 5 thousandths of an inch, is present between the tube 184 and the surfaces of the counterbores 182.

Figure 6:
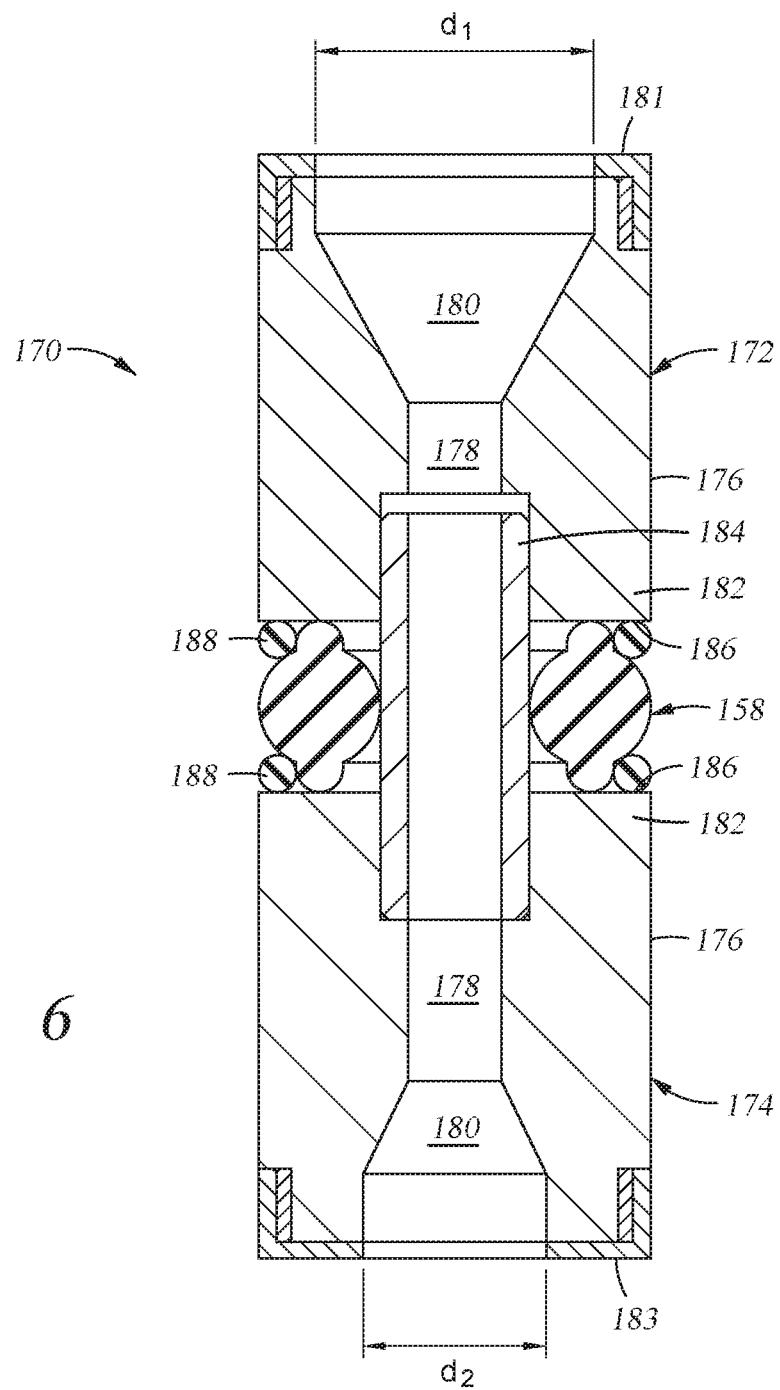
FIG. 6 is a sectional view of a bidirectional seal assembly and opposed seal plate assemblies wherein the bidirectional seal assembly is moved from the position thereof to allow fluid to flow from an inlet passage to a second of two outlet passages.
Figure 7:
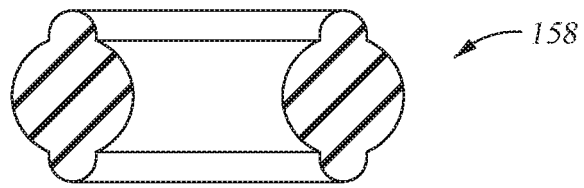
FIG. 7 is an enlarged sectional view a bidirectional seal assembly useful in the valve of FIG. 2.

The first and second seal elements 172, 174 are, in the embodiment of FIG. 4, right cylindrical elements having the same outer diameter, the same bore 178 diameter and the same counterbore diameter. However, the inner diameter of a countersunk opening 180a of the first sealing element 172 facing the first seal plate 105 has a larger diameter than the countersunk opening 180b of the second seal element 174 facing the second seal plate 111. The first seal element 172 thus includes an annular seal face 181 having a first area extending between the counterbore 180 of the first seal element 172 and the outer diameter thereof, and the second seal element 174 includes an annular seal face 183 having a second area extending between the counterbore 180 of the second seal element 174 and the outer diameter thereof. The area of the second seal face 183 is greater than that of first seal face 181. The opening diameter d2 of the countersunk opening 180 in the second seal element 174 at the annular seal face is slightly less than the closest spacing "d" between the first and second outlet block passages 110, 116 at the second sealing surface 112, and the outer diameter of the outer surfaces 176 of the first and second seal elements 172, 174 is slightly larger than the largest distance "D" across the adjacent first and second outlet block passages 110, 116. A biasing element 158, such as the key seal structure illustrated in FIG. 8 and in application U.S. Ser. No. 14/067,398 filed Oct. 30, 2013, which is herein incorporated by reference, is located between the back side 186 surfaces of the sealing elements 172, 174 to bias them outwardly of the seal bore 162. Backing rings 188 (FIG. 6), or other elements to ensure the integrity of the biasing element, may be provided between the biasing element 158 and the back side 186 surfaces.

Each of the two the two sealing elements 172, 174 are configured to be identical, but for the diameters d1 and d2 thereof. Here, the diameter d1 of the bore opening out from the countersunk opening 180 of sealing element 172 is greater than the diameter d2 of the bore opening out from the countersunk opening 180 of sealing element 174. This relationship allows the positioning of the sealing faces of the sealing elements to selectively block both openings 464 in the second sealing plate 111 simultaneously, as shown in FIGS. 3 and 4, and thus prevent fluid communication between opening 460 and openings 462, 464, as well as selectively allow fluid communication between opening 460 and only one of openings 462, 464 by selective positioning of the location of the seal bore 162, and thus the sealing faces of the sealing elements, with respect to openings 462, 464, while maintaining opening 460 in fluid communication with the bores 178 of the sealing elements 172, 174 and of the alignment tube 184.

Figure 10:
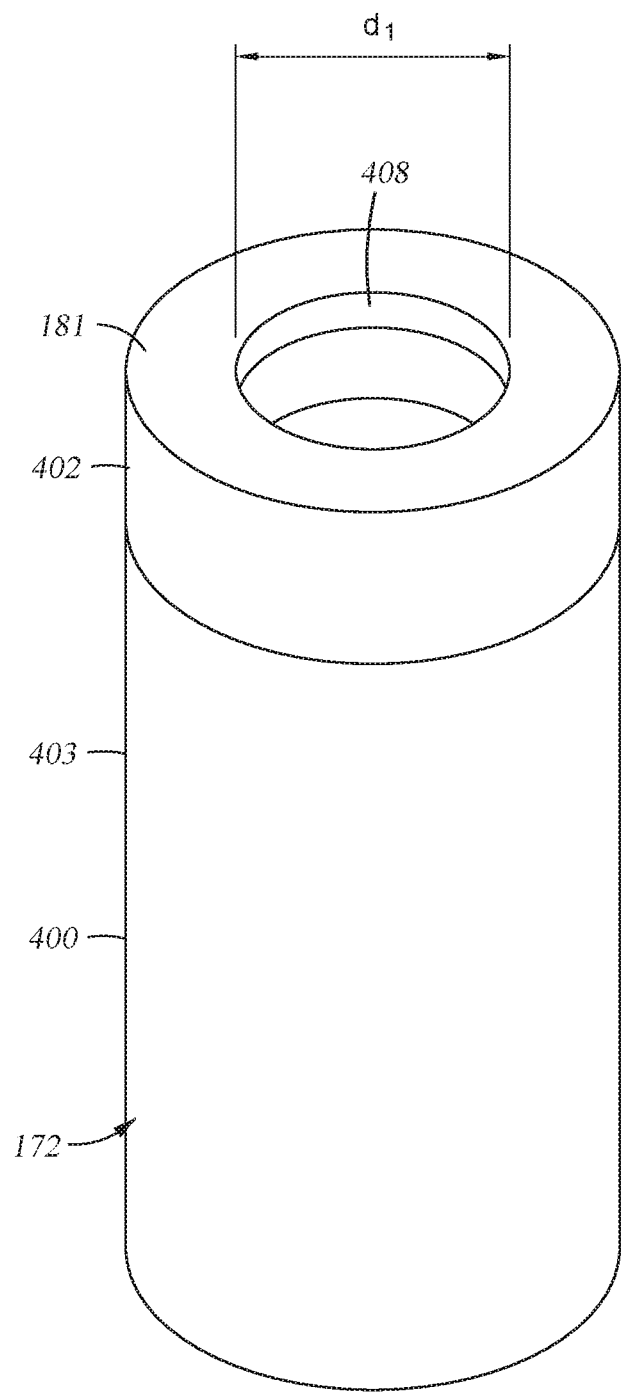
FIG. 10 is an isometric view of a sliding seal element of the valve of FIG. 1 having an insert on the sealing surface side thereof.
Figure 11:
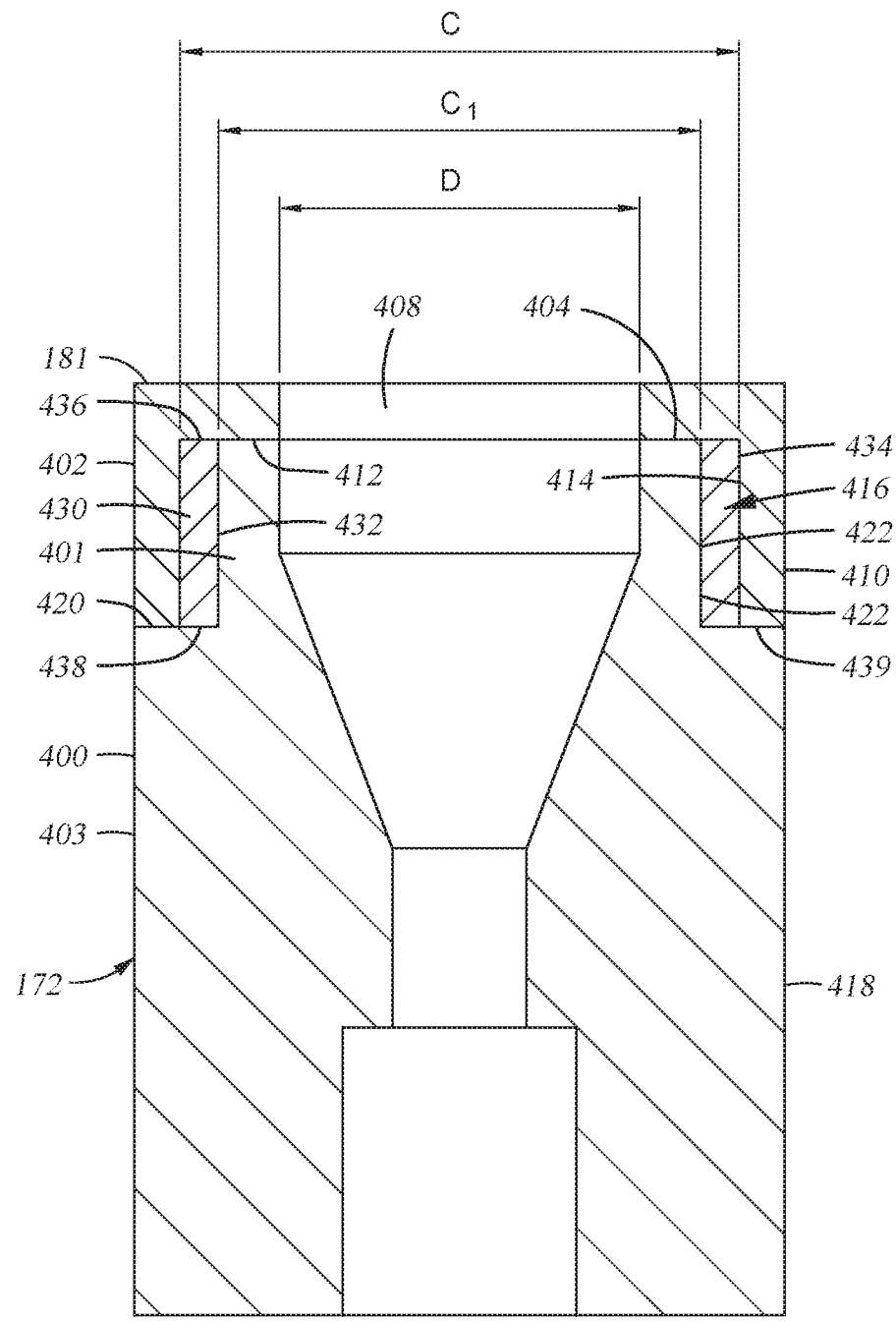
FIG. 11 is a sectional view of the sliding seal element of FIG. 10.
Figure 12:
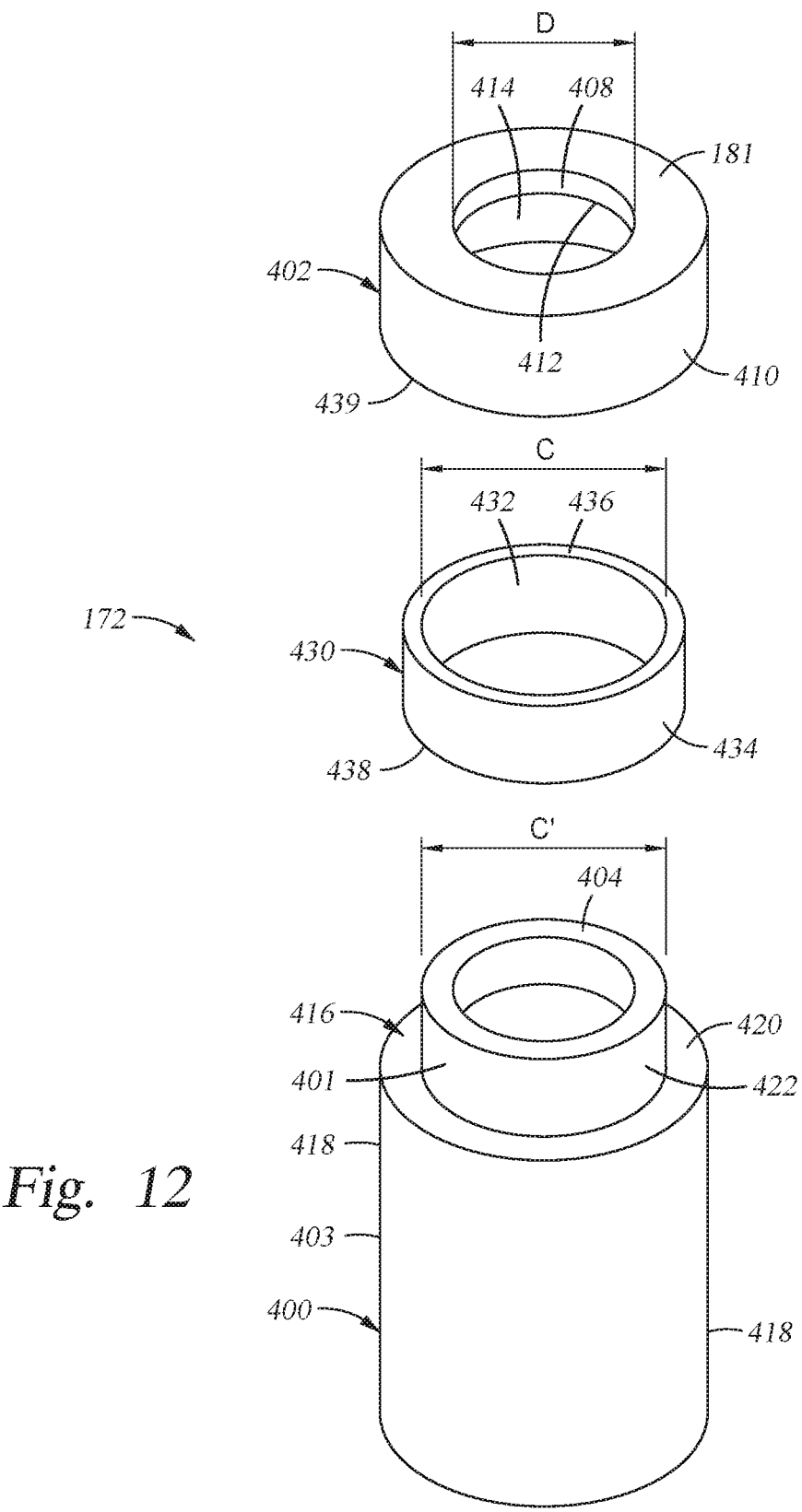
FIG. 12 is an exploded view of the sliding seal assembly of FIG. 10.

In FIGS. 10 to 12, sealing element 172 is shown. Sealing element 174 has substantially the same construct as sealing element 174, except for the inner diameter d1 of the opening in the annular seal face 181. Sealing element 172 (and 174) are here configured of a body 400, here a stainless steel body to prevent corrosion thereof when exposed to high pressure fluids which may have corrosive elements therein, a capping insert 402 at the seal plate 105 facing end thereof, and a ring or sleeve shaped insert sleeve 430, configured of a compressible material having a lower modulus of elasticity than the material of the body, but sufficient strength that it will not become sheared during assembly of the capping insert 402 onto the body 400, for example PEEK, thirty percent (30%) carbon filled PEEK, Delrin® and Teflon®.

Capping insert 402 is configured in a ring shaped like construct, wherein an annular ring shaped portion 408 includes the annular seal face 181 as one surface thereof surrounding an opening of diameter D therethrough, and from the opposite side thereof extends an annular or tubular section 410 having an inner wall 414 of a diameter C, which is greater than the diameter D, such that an annular support wall 412 extends from the circumference of the opening to the inner wall 414. Body 400 of the sealing element 172 is configured of, for example, stainless steel, and at the seal plate facing end 404 thereof it includes an outer, circumferential recess 416 extending radially inwardly of the outer wall 418 of the body 400, such that an annular ledge 420 and a stub wall 422 extending therefrom in the direction of seal plate end 404 is formed. Stub wall 422 forms the outer circumferential surface of a generally right cylindrical stub 401 extending from the main portion 403 of the body 400.

The sleeve 430 is located between the inner wall 414 and the annular support wall 412 of the capping insert 402 and the annular ledge 420 and stub wall 422 of the body 400. Sleeve 430 includes an inner circumferential wall having a diameter slightly less than, or equal to, the diameter $C_1$ of the stub wall 422, and an outer circumferential wall 434 having a diameter slightly larger than, or equal to, the diameter C of the inner wall 414, and thus the inner circumference of the sleeve 430 is equal to, or slightly less than, the outer circumference of the stub wall 422 and the outer circumference of the sleeve is equal to, or greater than, the inner circumference of the inner wall 414 of the insert 402. Sleeve 430 further includes an annular base wall 438 and an upper annular wall 436.

To assemble the insert 402 with the body 400, sleeve 430 is preferably pushed over the stub wall 422 of the stub 401 until the base wall 438 thereof contacts, or nearly contacts, the annular ledge 420 of the base, and then the insert 402 is pressed thereover. Preferably, the insert 402 is pressed over the sleeve 430 until one of the annular support wall 412 thereof contacts the end of the stub 401 of the body 400, or the base wall 438 of the insert 402 contacts the annular ledge 420 of the body 400. The configuration and assembly of the sealing element 174 is identical to that of sealing element 172, except that the inner diameter d2 of both the body 400 and the insert 402 thereof is smaller than the inner diameter d1 of the body 400 and insert 402 of sealing element 172. In either case, a small gap may be present between both the annular support wall 412 at the end of the stub 401 of the body 400, and the base wall 438 of the insert 402 and the annular ledge 420 of the body 400. This allows the insert 400 to "float" on the body 400, and thus allows the sealing face 181 thereof to slightly change its orientation with respect to the body 400 to help align the sealing face 181 in parallel with a corresponding sealing surface 106, 112 of a sealing plate 105, 111.

Figure 5:
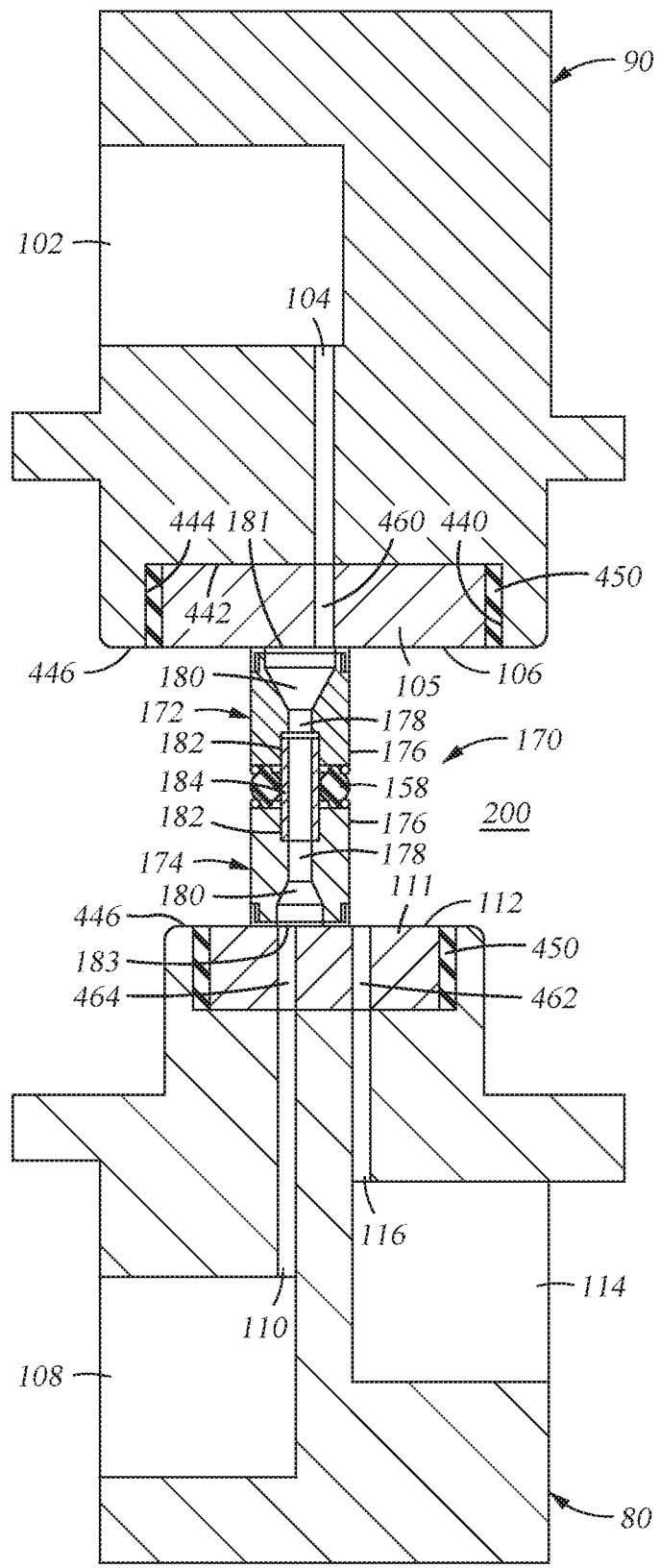
FIG. 5 is a sectional view of a bidirectional seal assembly and opposed seal plate assemblies wherein the bidirectional seal assembly is moved from the position thereof to allow fluid to flow from an inlet passage to a first of two outlet passages.

In the embodiment of FIGS. 1 to 5 hereof, the first and second sealing plates 105, 111 providing the upper and lower sealing surfaces 106, 112 are also provided as a recessed insert 190, each having continuation passages extending therethrough to communicate with the inlet 104 and first and second outlet block passages 110, 116 of the valve block 100. In the embodiment, both of the recessed inserts 190 are also configured as a single crystal or a carbide material, preferably the same single crystal or carbide material of the first and second seal elements 172, 174. The single crystal material is preferably chosen from among a single crystal ruby and a single crystal sapphire. In operation, the carrier 150 is moveable in the direction of arrows A and S of FIG. 2, to selectively align the passage formed through the tube 184 and the countersunk openings 180a, b therein with the inlet passage 104 and either one or the other of the first and second outlet block passages 110, 116 to allow flow from the inlet 102 to one of the outlets 108, 114, or to prevent flow from the inlet passage 104 to either one or the other of the first and second outlet block passages 110, 116 by aligning the annular sealing surface 190 to simultaneously block the first and second outlet block passages 110, 116, which also prevents direct fluid communication as between first and second outlet block passages 110, 116. These relative positions of the bidirectional seal assembly 170 are shown in FIGS. 3 to 5.

To secure the sealing plates 105, 111 in the body of the inlet body 90 and the outlet body 80, as shown in FIGS. 3 and 4, each of the inlet body 90 and outlet body 80 include a generally right annular recess 440 extending inwardly of the central portion of the end wall 446 thereof facing the seal carrier 150 and thus the capping inserts 402 on the ends of the first and second seal elements 172, 174, each right annular recess 440 having an outer circumferential wall 444 and a base wall 442, into which inlet block passage 104 or first and second outlet block passages 110, 116 extend. The sealing plate 105 includes a through opening 460 in registration with inlet block passage 104, and the sealing plate 111 includes two through openings 462, 464, each in registration with the first or second outlet block passages 110, 116, respectively. A sealing plate sleeve 450, here a generally right annular element composed of PEEK, thirty percent (30%) carbon filled PEEK, Delrin® and Teflon® similarly to sleeve 430, is disposed between the outer circumference of the sealing plates 105, 111 and the corresponding outer circumferential wall 44o of a recess 440, wherein the inner circumference and diameter thereof are less than or equal to the outer diameter and circumference of the sealing plate 105, 111, and the outer circumference and diameter thereof are equal to, or greater than, the inner circumference and diameter of the outer circumferential wall 444 of the recess 440. Similarly to the assembly of the inserts 402 on the bodies 400 of the first and second seal elements 172, 174, to assemble the insert into its respective inlet body of outlet body 90, 80, the sealing plate sleeve 450 is pushed into the recess 440, and the sealing plate 105, 111 is pressed into the sealing plate sleeve 450. Again, compression of the sealing plate sleeve 450 is sufficient to maintain the sealing plate sleeve 450, and the sealing plates 105, 111, in place in their respective bodies 90, 80, but also allow the sealing plates 105, 111 move with respect to the inlet and outlet bodies 80, 90, and thereby achieve a parallel relationship of the sealing surfaces 106, 112 thereof with the facing sealing surfaces of an adjacent insert 402.

In operation, the sealing elements 172, 174 of the bidirectional seal assembly 170 are positionable to selectively allow, or block, fluid flow from inlet passage 104 to one of the first and second outlet block passages 110, 116. In FIGS. 1, 2 and 3, the bidirectional seal assembly 170 is positioned such that countersunk opening in the first sealing element 172 is aligned with the inlet block passage 104, and the second seal face 183 overlies, and covers, both of first and second outlet block passages 110, 116. In FIG. 4, the carrier 150 (FIGS. 1 and 2) has moved the bidirectional seal assembly 170 from the position of FIG. 3, such that inlet passage 104 s communicated with outlet passage 116, and first outlet passage 110 is exposed to the interior volume 200 of the valve, which may be configured with a vent passage to thereby vent the pressure in the first outlet passage 110. In FIG. 5, the carrier 150 (FIGS. 1 and 2) has moved the bidirectional seal assembly 170 from the position of FIG. 3, such that inlet passage 104 is communicated with first outlet passage 110, and outlet passage 116 is exposed to the interior volume 200 of the valve, which may be configured with a vent passage to thereby vent the pressure in the outlet passage 116.

Figure 8:
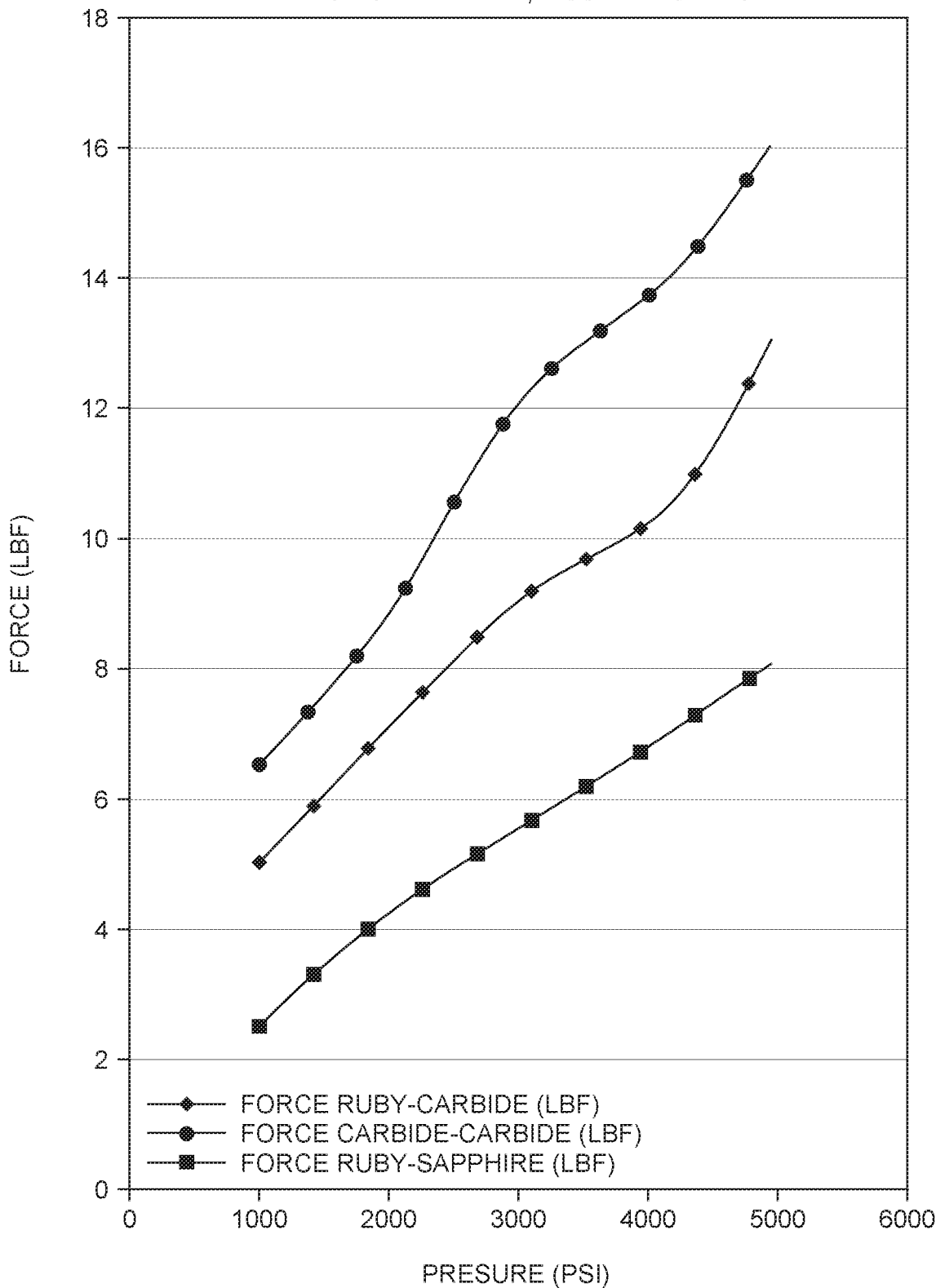
FIG. 8 is a sectional view of a seal used in the bidirectional seal assembly of FIG. 7.

FIG. 8 is a graph showing the force needed to move the carrier with respect to the seal plate surfaces 106, 112 as a function of the pressure at the inlet 102 for different sealing element 172, 174 materials and different sealing plate 105, 111 materials. Using the valve of FIGS. 1 and 2, a load cell was interposed between an electromechanical actuator and the actuation rod 134, and no spring return was present, and the force needed to move the carrier 150 from the position of FIGS. 1 and 2 to the right or to the left of FIGS. 1 and 2 was measured at a series of discrete inlet pressures using a valve with three different sealing element 172, 174 and sealing plate 105, 111 material combinations: Carbide to carbide, carbide to ruby, and ruby to sapphire. In the valve, the first annular seal face 181 had a surface area of approximately 0.0091 square inches, and the annular seal face 183 had a surface area of approximately 0.0117 square inches. As shown in FIG. 3, the force in pounds-force (lbf) increases as the fluid pressure, in psi on the inlet 104 increases. However, by using a single crystal material as the material of the sealing elements 172, 174 and/or the sealing plates 105, 111 and thus the sealing surfaces 106, 112, a significant reduction in the initial force, and thus the stored hydraulic energy required to initiate movement of the sealing elements 172, 174 with respect to the sealing surfaces 106, 112, is achieved. For example, at an inlet pressure of 1000 psi, over 6 lbf are required to move the sealing elements 172, 174 and sealing surfaces 106, 112 with respect to each other when both are configured from tungsten carbide. By changing one of the sealing elements 172, 174 or sealing surfaces 106, 112 to ruby, that force requirement is reduced to approximately 5 lbf, and when configuring one of the sealing elements 172, 174 and sealing surfaces 106, 112 of ruby, and the other of the sealing elements 172, 174 and sealing surfaces 106, 112 of sapphire, the force required to move the sealing elements 172, 174 and sealing surfaces 106, 112 with respect to one another is less than 3 lbf, which is less than one-half that of the carbide-carbide interface. The relative force required to move a ruby to sapphire interface will be the same as a sapphire to sapphire interface.

At higher inlet 104 pressures the reduction in force required to move the sealing elements 172, 174 and sealing surfaces 106, 112 with respect to each other is even more pronounced. At about 4500 psi inlet 104 pressure, the tungsten carbide to tungsten carbide interface requires over 15 lbf to begin moving, whereas the ruby to carbide interface requires under 12 psi to begin moving, and the ruby to sapphire interface requires less than 8 lbf to begin moving. Thus, at the lower pressure of about 1000 psi, a reduction in force of about 4 lbf, which is ⅓ that required for the carbide to carbide interface is used, is possible using a ruby to sapphire interface. At the higher pressure of about 4500 psi, a reduction in force of about 8 lbf, which is ½ that required for the carbide to carbide interface is used, is possible using a ruby to sapphire interface. It is believed that this is due to the lower electrical affinity of the surface of a single crystal material to an adjacent single crystal surface, as compared to that of a non-single crystal surface to a non-single crystal, or a single crystal, surface.

Figure 9:
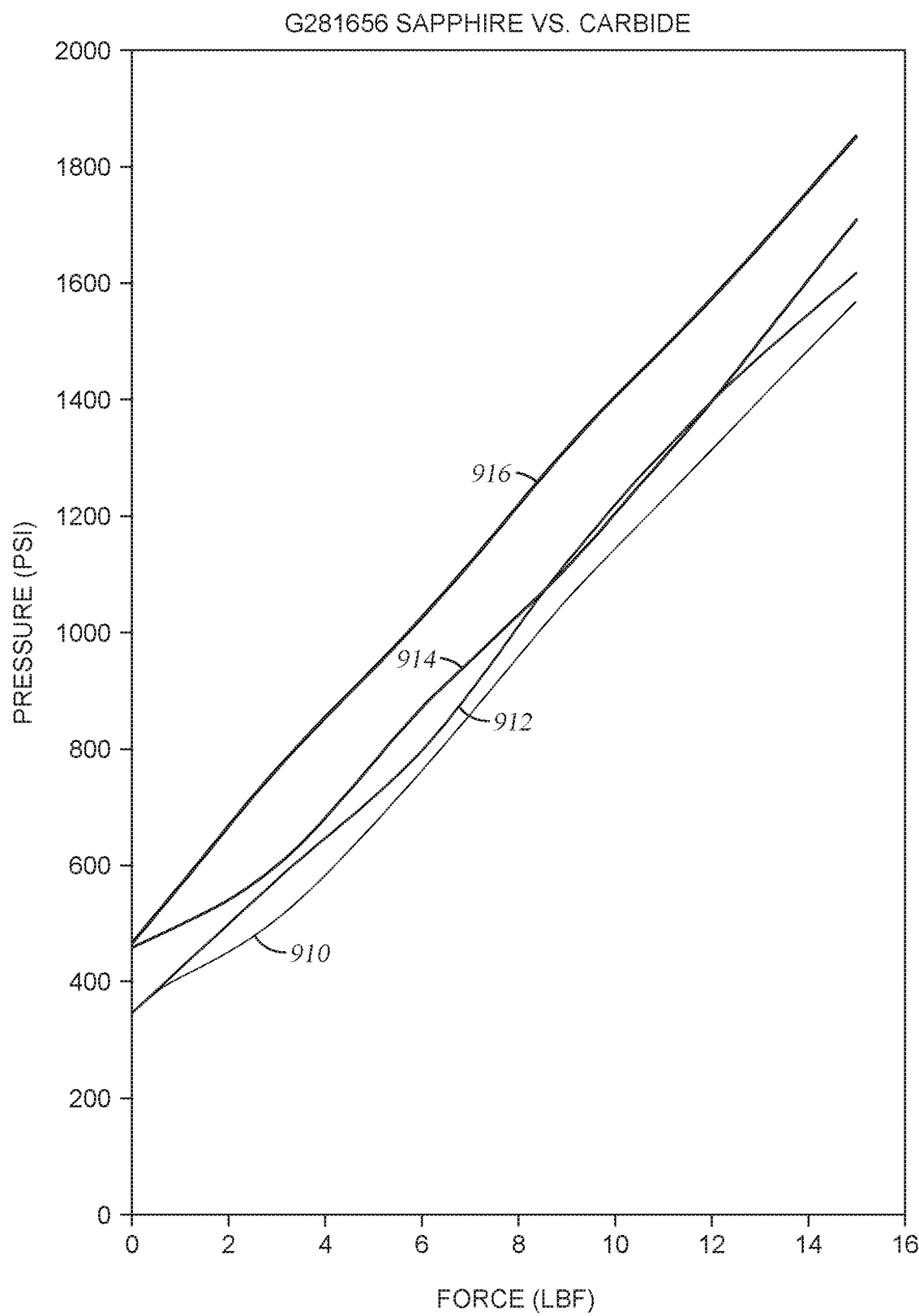
FIG. 9 is a graph showing the force required to begin moving the seal carrier with respect to the seal plate surfaces of the valve of FIG. 2.

Referring to FIG. 9, an additional graph showing the relationship between the force required to overcome a pressure and move the sealing components with respect to each other, for both dynamic and static (starting from a fixed position) motion. Here, it is evident that the force required to slide a carbide to carbide interface at a given pressure pushing the sealing surfaces together, curves 910 and 912, is greater than that required to move slide two sapphire sealing surfaces with respect to each other, curves 914 and 916. Curve 16 shows the relationship between pressure and force for an already moving sapphire-sapphire sealing interface, curve 14 shows the relationship between pressure and force for initiating movement of a sapphire-sapphire sealing interface, curve 912 shows the relationship between pressure and force for an already moving carbide to carbide sealing interface, and curve 910 shows the relationship between pressure and force for initiating movement of a carbide to carbide sealing interface. For example, at a pressure of 600 psi pressing the sealing surfaces together, approximately 1.5 lbf is required to maintain a sapphire to sapphire sealing interface moving, and approximately 3 lbf is required to initiate movement of a sapphire to sapphire sealing interface. In contrast, for a carbide to carbide sealing interface at a pressure of 600 psi pressing the sealing surfaces together, maintaining movement of the interface requires slightly more than 3 lbf, and to initiate movement of the sealing interface, slightly more than 4 lbf. Additionally, at all pressures the force required to initiate movement or maintain movement of the sapphire to sapphire sealing interface is less than that to initiate or maintain movement of the carbide to carbide sealing interface.

In addition to sapphire and ruby single crystal materials, the inventor hereof has discovered that a sliding interface comprising at least one zirconia surface results in reduced stiction as compared to a carbide-carbide sliding interface under the same operating conditions. For example, where one of the two surfaces having relative sliding motion with respect to each other is configured of Zirconia and the other of tungsten carbide, under the same operating conditions, a reduction of stiction, on the order of 20% as compared to a tungsten carbide-tungsten carbide sliding interface results. For example, the inventor hereof has found that the zirconium-yttria blend of approximately 3% Yttria, commonly referred to as tetragonal zirconia polycrystalline material or Zirconia 3T-TZP, used as one surface of the sliding interface, and tungsten carbide as the other surface of the sliding interface, resulted in a reduction of stiction compared to that of a tungsten-carbide-tungsten carbide sliding interface under the same loading conditions. Likewise, the inventor hereof has found that aluminum stabilized zirconia, also known as AZP, used as one surface of the sliding interface, and tungsten carbide as the other surface of the sliding interface, resulted in a reduction of stiction compared to that of a tungsten-carbide-tungsten carbide sliding interface under the same loading conditions. As an alternate embodiment, the use of tungsten carbide against Zirconia, for instance Zirconia 3T-TZP or AZP in sliding contact will also produce a low friction couple as a shear seal. Likewise, a zirconia-zirconia sliding interface will result in a reduction of stiction on the order of 50%.

In addition to having reduced stiction as compared to a carbide-carbide sliding interface, a zirconia-carbide interface has improved manufacturability as compared to sapphire of ruby materials. For example, the capping inserts 402 can be manufactured from Zirconia 3T-TZP or AZP and the recessed inserts forming the sealing plates 105, 111 manufactured of tungsten carbide. Thus, at the interface of the sliding seal plate surfaces 106, 112 and annular seal faces 181, 183 of FIG. 3, a reduction of stiction of approximately 20% can be achieved over a carbide-carbide interface, and the sealing elements 172, 174 and the sealing plates 105, 111 are more easily, and less expensively, manufactured as compared to where they are manufactured of ruby or sapphire. Additionally, both the tungsten carbide and the Zirconia 3T-TZP can be spray coated, such that the base material of the inserts 402 of the sealing 172, 174 and the sealing plates 105, 111 are manufactured from, for example stainless steel or a another high strength metal, and tungsten carbide is spray coated on the sealing surface side of one of the inserts 402 of the sealing elements 172, 174 and the sealing plates 105, 111 and Zirconia 3T-TZP is spray coated on the other of the inserts 402 of the sealing elements 172, 174 and the sealing plates 105, 111. Preferably, where the carbide surface is provided by a monolithic, i.e., non-spray coated component, the seal plates 105, 111 are configured of the more brittle tungsten carbide. Further, the carbide, zirconia, or both materials can be provides as inserts brazed to an underlying material to form a lower stiction sliding interface. Additionally, as compared to ruby or sapphire materials, Zirconia is more easily machined, and is also susceptible to being machined into more complex shapes and geometries. Furthermore, zirconia itself, as opposed to Zirconia 3T-TZP or AZP, may be used as the sliding surface, either against another zirconia surface, or a carbide surface such as tungsten carbide.

Additionally, ruby-carbide and sapphire-carbide sliding interfaces are also contemplated herein, wherein one of the capping inserts 402 of the sealing elements 172, 174 and the recessed inset forming the sealing plates 105, 111 is configured of a monolithic carbide such as tungsten carbide or configured from a base material such as stainless steel and the sliding surfaces are provided by spray coating a carbide, such as tungsten carbide thereon, and the other of the capping inserts 402 of the sealing elements 172, 174 and the recessed inserts of the sealing plates 105, 111 is configured of sapphire or ruby. For example, the inventor hereof has discovered that the sapphire-tungsten carbide interface has a reduced stiction as compared to the tungsten carbide-tungsten carbide interface on the order of 20%, although not as significant as opposed to the 50% possible with Sapphire against Sapphire or Zirconia against Tungsten Carbide. In addition, a sliding interface of a zirconia material and one of sapphire or ruby, a sliding interface where one surface is sapphire and the other is ruby, are specifically contemplated here.

Other devices using hydraulically operated pistons, such as a pressure regulator as shown in U.S. patent application Ser. No. 14/837,192, filed Aug. 27, 2015 and incorporated herein by reference can also benefit from the use of carbide, sapphire and ruby inserts in or on components thereof.

As used herein, the use of zirconia, ruby and/or sapphire as the relative sliding surfaces, or combined with a carbide such as tungsten carbide as the other relatively sliding surface, as the components of the sliding interfaces results in a smaller dead zone, lower life as a result of lower wear and high corrosion resistance, and the ability to reduce the size of the stored energy components, such as springs, used to restore the hydraulic circuit component to its rest state.

As contemplated herein, ruby or sapphire, wherein ruby is a doped form of sapphire, are available in sheet or rod form from various supplier such as Saint Gobain of Milford N.H. The sapphire and ruby used herein were ½ light band ruby and 4RA and 2 light band sapphire. The parts, such as the sealing inserts and seal plate surfaces inserts were machined from these materials using diamond cutters, and then lapped to improve surface finish. Where the sliding interface surface is an insert attached to another component, such as a sealing plate assembly, one surface of the insert is metallized, and the metallized surface is then brazed or otherwise connected to an underlying metal component, such as a stainless steel component.

Figure 13:
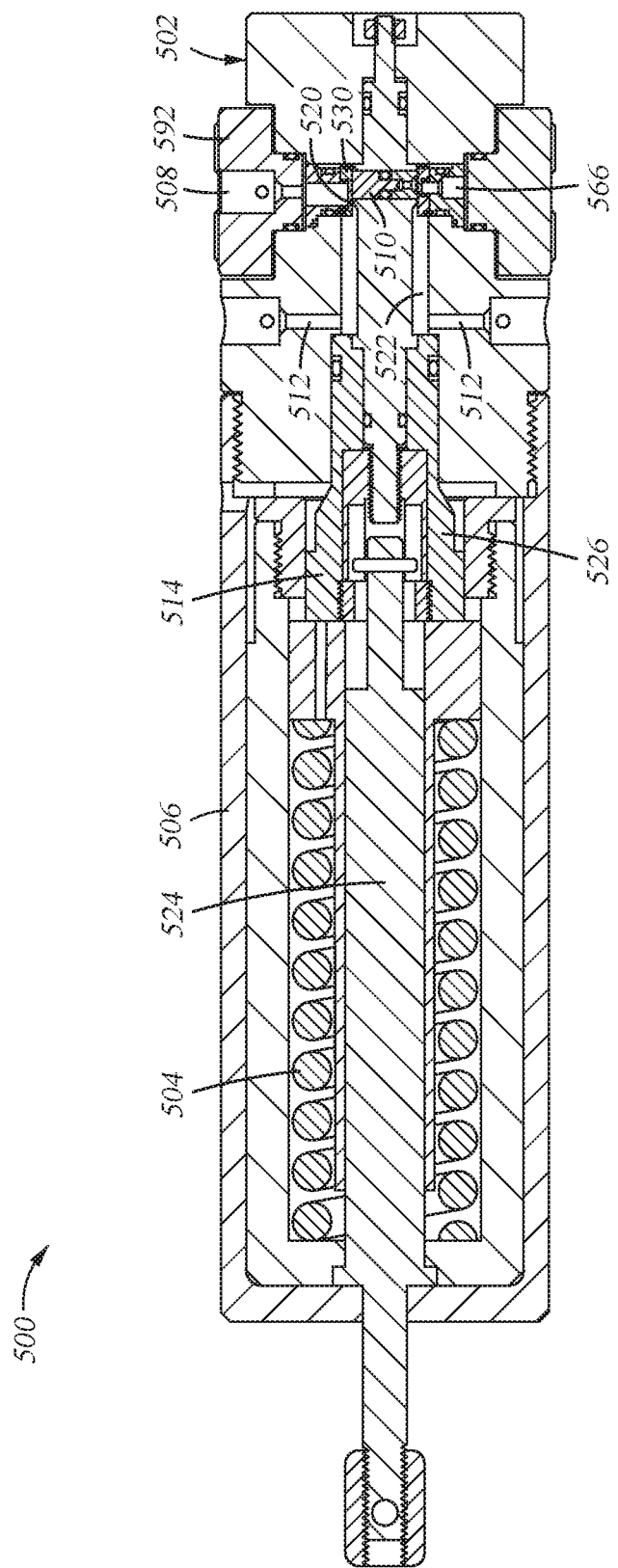
FIG. 13 is a sectional view of an alternate valve construct having an insert at a shear seal interface thereof.
Figure 14:
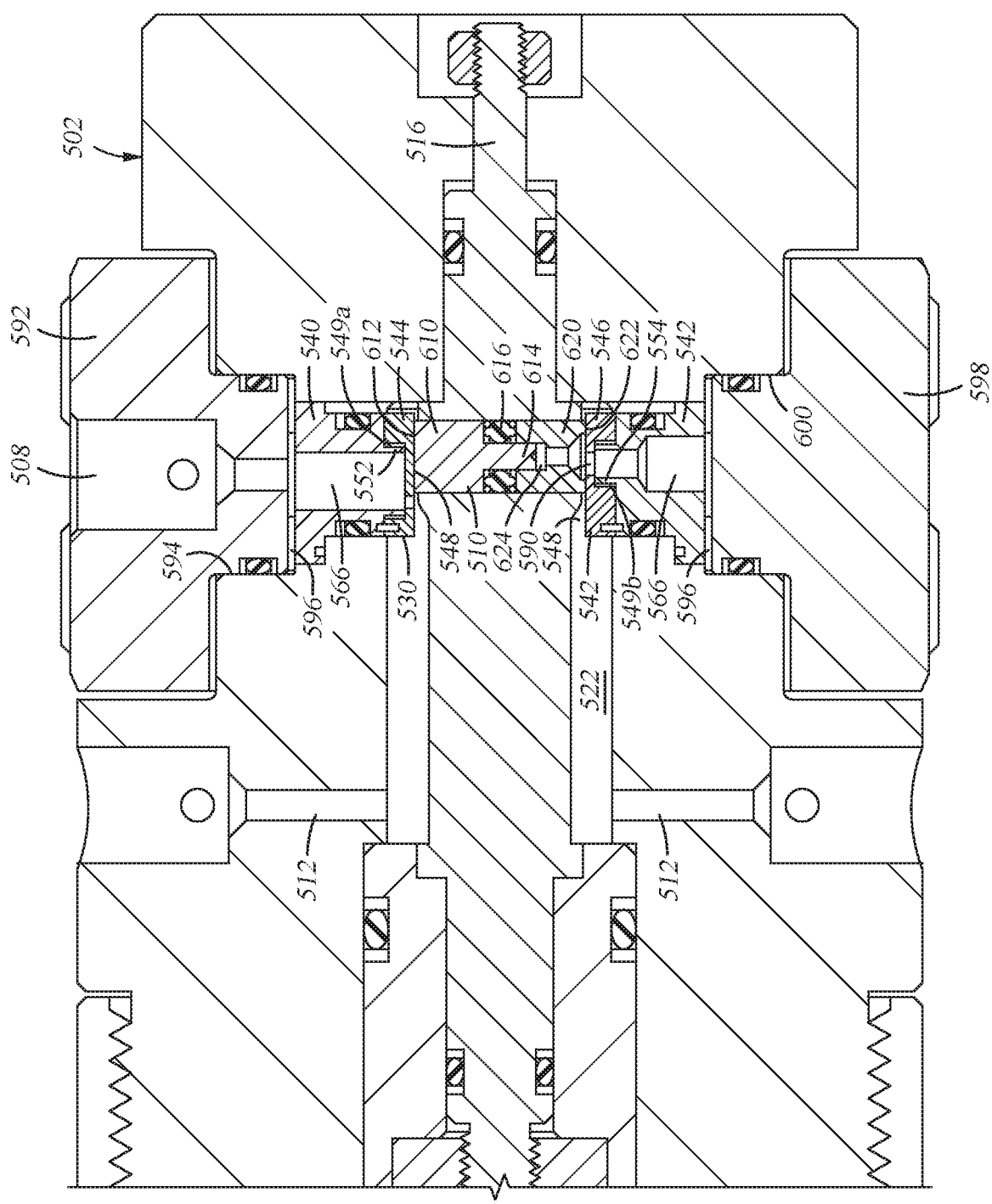
FIG. 14 is an enlarged sectional view of the valve body of the valve of FIG. 13.
Figure 15:
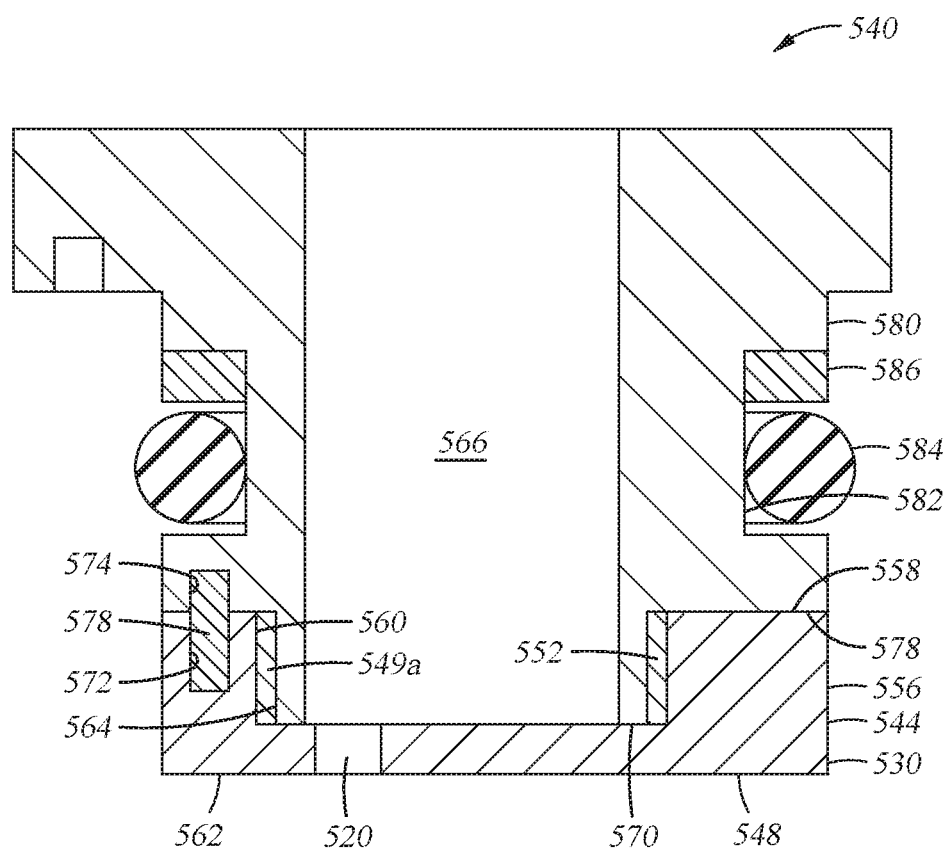
FIG. 15 is an enlarged view of the connection of the sealing plate to a modular insert of the valve of FIG. 14.

FIGS. 13 to 15 show another embodiment of a valve using a single crystal or carbide insert affixed thereto using a sleeve. Here, a pressure regulating valve 500 includes a valve body 502, a bias member 504, and a bias member cover 506. In operation, pressure at valve inlet 508 is distributed to the opposed sides of a shear seal assembly 510, and pressure at the valve outlet 512 is also present in interior volume 522 of the valve 500 and bears against a piston 514 which is biased toward the right side of the Figure by the spring 514. If an under-pressure condition occurs at the outlet 512 and thus the pressure in interior volume 522 falls below a threshold pressure, the shear seal assembly 510, held in a bore of cross stem 516 connected to spring rod 524 through coupling 526 is moved to the right as shown in FIG. 14, by the force of the spring overcoming the pressure force of the outlet pressure on the piston 514, causing an opening 520 in a first inlet module capping insert 530 in fluid communication with inlet 508 to be exposed into the interior volume 522 of the valve 500, and thus allowing a higher pressure maintained at the inlet 508 to pass through the outlets 512. As the pressure downstream of the outlets 512 increases due to the fluid at the supply pressure being applied thereto, the pressure in the interior volume 522, to which the piston 514 is exposed, increases, and when sufficient pressure is achieved, it pushes the piston 514 to the left in FIG. 14 and thereby pull the cross stem 516 connected thereto to likewise be pulled to the left, causing the shear seal assembly to cover the opening 520.

As shown in greater detail in FIG. 14, wherein the valve body 502 is shown enlarged, shear seal assembly 510 includes opposed first and second inlet modules 540, 542, each configured with a single crystal or carbide first or second inlet module capping insert 530 press fit over the facing portions thereof, here a first inlet module capping insert 544 and a second inlet module capping insert 546. The connection of the first inlet module capping insert 544 to the first inlet module 540 is shown in FIG. 15, and the connection of the second inlet module capping insert 546 to second inlet module 542 is identical. As with the valve of FIGS. 1 to 5, here a compressible, ring shaped sleeve(549a, b) is disposed between the first and second inlet module capping inserts 544, 546 and a securing surface of a corresponding one of the first and second inlet modules 540, 542, such that a generally flat seal plate surface 548 of one of the first and second inlet module capping inserts 544, 546 is positioned to face the generally flat seal plate surface 548 of the other one of the first and second inlet module capping inserts 544, 546, with the sealing elements 172, 174 disposed therebetween. In contrast to the connection between the seal plate and the adjacent valve component by which it is supported where the sleeve is held in a recess of the valve component, here the first and second ring shaped sleeves 549a, b are secured over a respective one of first and second stub boss 552, 554 extending from the first and the second inlet modules 542, 544. As best shown in FIG. 15, first inlet module capping insert 544 includes a generally cylindrical in shape outer surface 556, an inlet module side annular surface 558 having a first mounting aperture 560 extending therefrom and terminating therein at a location spaced from seal plate surface 548. Here, aperture is a generally right cylindrical opening into the module side annular surface and off set from the center thereof, in the direction of the bias member 504 of the valve 500. First ring shaped sleeve 549a is a ring shaped member which is located between the cylindrical wall of the aperture 560 and the outer cylindrical wall 564 of the first stub boss 552. First inlet module includes flow passage 566 extending therein to the end wall 570 of the first stub boss 522, and first insert 544 includes the opening 520 configured as an offset flow passage therethrough fluidly connected to the flow passage 566 of the first stub boss 522. To properly align the offset flow passage 560 with the flow passage 566 of the first stub boss 522, a module side annular surface 558 of first insert 544 includes an alignment pin opening 572 extending thereinto, insert facing surface 578 of the first inlet module 540 includes a mating pin opening 574, and an alignment pin 578 extends inwardly of both pin openings 572, 574. Here, alignment pin is sized slightly smaller than the surrounding volume provided by pin openings 572, 574 to prevent stress being developed in the first insert 544. Along the outer cylindrical wall 580 of the first inlet module 540, a seal groove 582 is provided, within which a seal such and an O-ring 584, and a backup ring 586 are provided.

The structure of the second inlet module 542 and the connection thereof with the second insert 546 is generally the same as that of the first inlet module and its connection to with the first insert 546. The main difference therebetween is the location of the opening 590 through the second inlet module capping insert 546 is generally centered to the flow passage 566 in the second inlet module 542.

To secure first and second inlet modules within the body 502 of the valve 500, an inlet adaptor 592 having inlet 508 therein is secured into an opening 594 in body 502, and a spacer 596 is located between the inner end 596 of the inlet adaptor 592 and the end of the first inlet module distal from the insert receiving end thereof. A blind adaptor 598 is secured inwardly of a blind adaptor opening 600 and a spacer 596 is likewise located between the inner end 596 of the blind adaptor 598 and the end of the second inlet module distal from the insert receiving end thereof.

In this embodiment, the shear seal assembly includes first and second self-biasing sealing elements 610, 620, each including a sealing face 612, 622 facing a respective one of the sealing surfaces of the sealing plate inserts 542, 544. In contrast to the embodiment shown in FIGS. 1 to 4, here the first and second self-biasing sealing elements 610, 620 do not include a single crystal of carbide insert fit thereon, and each may comprise, for example, stainless steel or other material, and only the second sealing surface 622 is an annular surface, and the first sealing surface is circular in plain view. Also, there is no flow passage extending through the sealing elements, and instead, here the first sealing element 610 includes a pin 614 extending therefrom, and into a pin opening 624 in the second sealing element 620. An annular seal volume 616 is formed between the first and second self-biasing sealing elements 610, 620, within which a key seal is located. Alternatively, the sealing surfaces of the self-biasing sealing elements 610, 620 may be formed as inserts or caps on the opposed sealing faces of the first and second self-biasing sealing elements 610, 620, and connected thereto by press fitting thereon or thereover using the compressible sleeve as in the prior embodiment hereof.

When pressure is applied to the inlet 508, a flow passage through the valve body (not shown) supplies this pressure to, and through, the opening 590, such that the same pressure is applied to against the sealing faces 612, 614 on opposed sides of the first and second self-biasing sealing elements 610, 620, as well as the end of the pin 614 facing the opening 590. As a result, this pressure maintains the sealing surfaces of the first and second self-biasing sealing elements 610, 620 biased against their respective first and second sealing plates.

Figure 16:
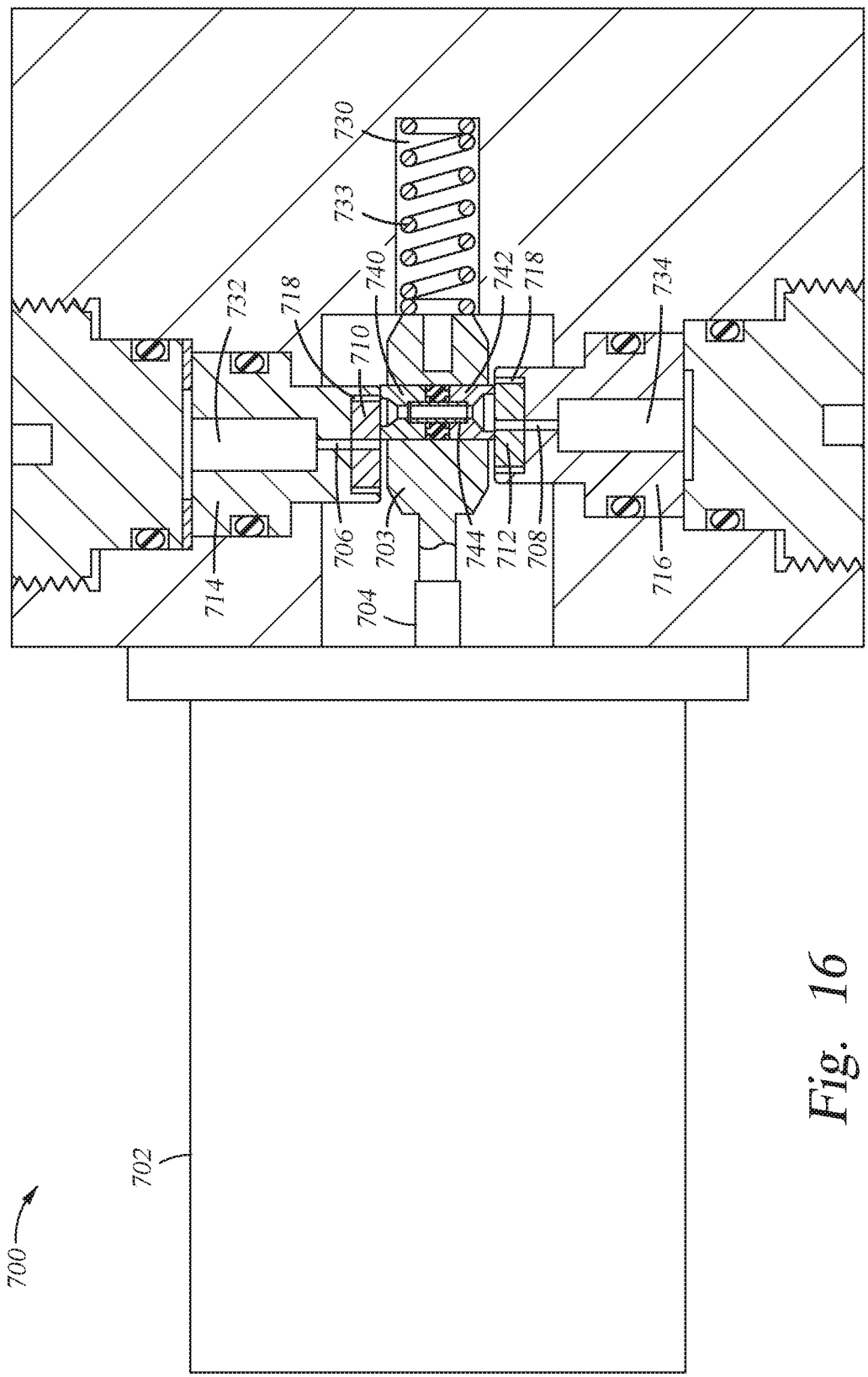
FIG. 16 is a view of a solenoid actuated valve, showing the valve components in section.

Referring now to FIG. 16, an additional embodiment, here solenoid operated valve 700 is shown. Solenoid actuated valve uses modular inserts to supply the flow passages selectively blocked by the sealing elements thereof, as in the valve of FIGS. 14 to 16. In contrast to the valve of FIGS. 14 to 16, solenoid actuated valve 700 is not operated based on pressures within the valve, but by a solenoid 702 positionable at two locations, and connected to the seal carrier 703 of the valve 700 by a connecting rod 704, the flow passages 706, 708 in the sealing plates 710, 712 are centered to the diameter thereof, as are the stem bosses 714, 716 of the inlet modules, and the sealing elements 740, 742 in the seal carrier 703 are connected by a hollow tube 744, allowing fluid communication therethrough. As with the valve of FIGS. 14 to 16, a sleeve 718 is provided between the stem bosses 714, 716 and a respective single crystal or carbide based sealing plate insert 720, 722. A spring 732, held in and extendable from spring pocket 730 in the body of the valve is located on the side of the seal carrier 703 opposed to the connection of the rod 704 thereto. In FIG. 16, the valve is shown whereby flow and fluid pressure communication between flow ports 732, 734 is blocked, and when solenoid 703 is actuated to pull the seal carrier toward the wall of the valve on which the solenoid 702 is mounted, flow and fluid communication is enabled by between the flow ports 732, 734 through the sealing elements 740, 742 and the hollow tube 744 in the carrier 703.

Figure 17:
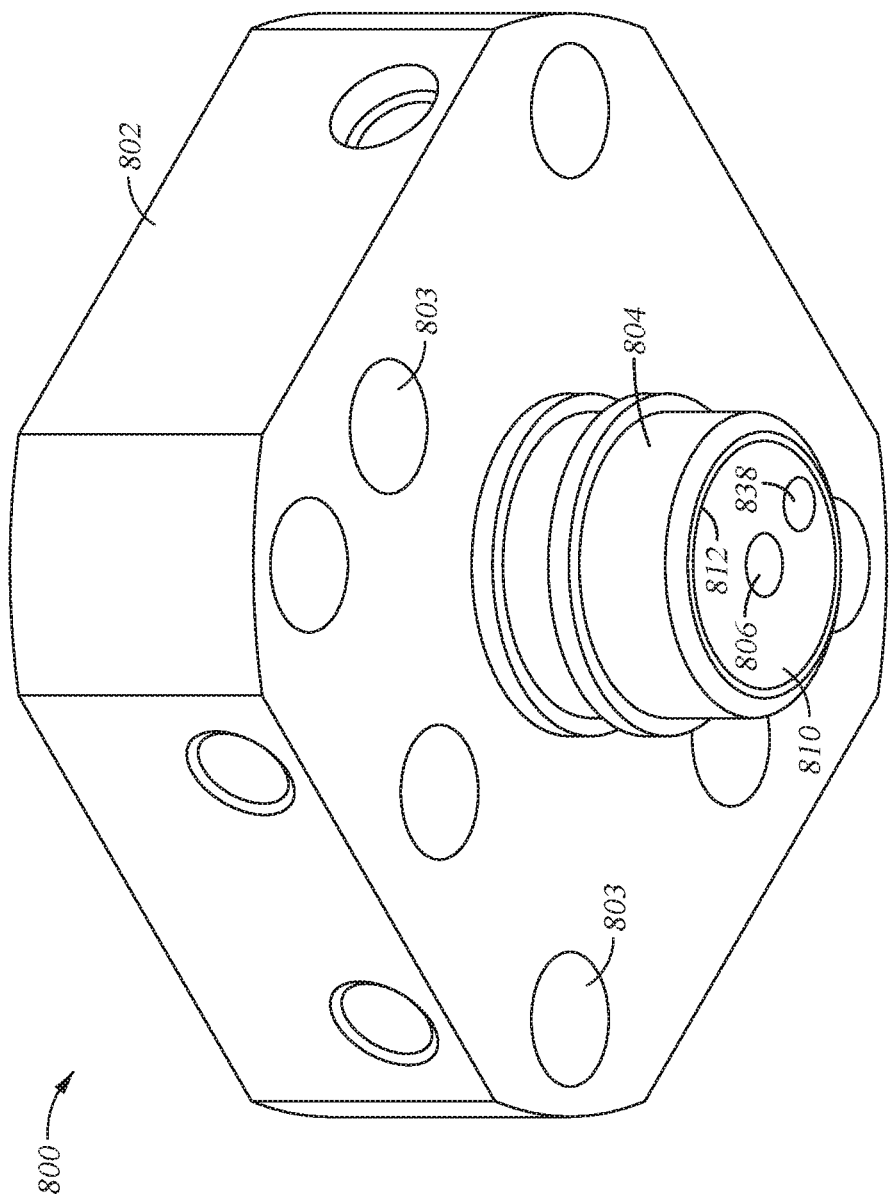
FIG. 17 is an isometric view of a seal plate carrier.
Figure 18:
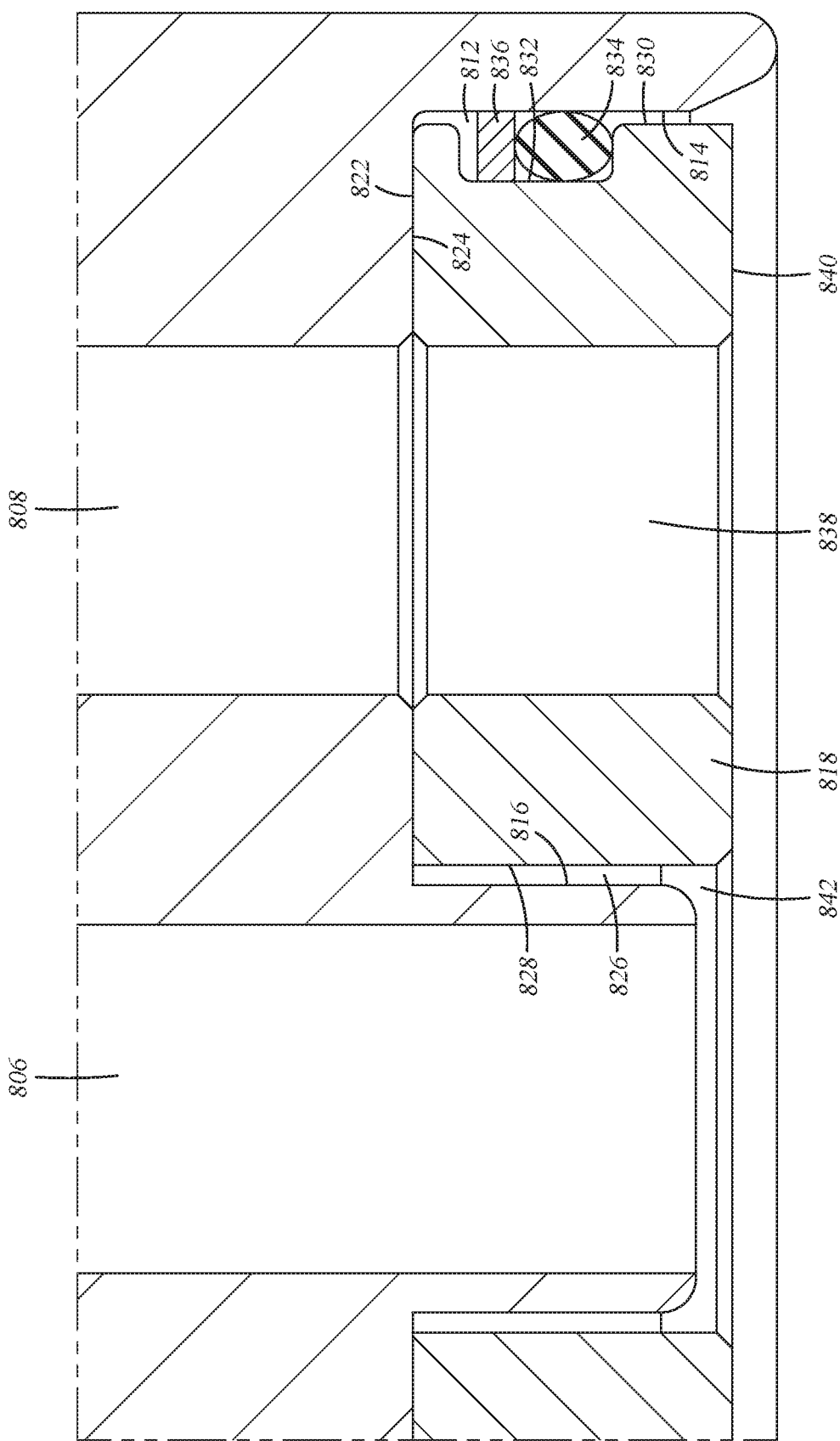
FIG. 18 is an enlarged sectional view of the end of the nipple of the seal plate carrier of FIG. 17, showing the connection of a single crystal or carbide insert therein.
Figure 19:
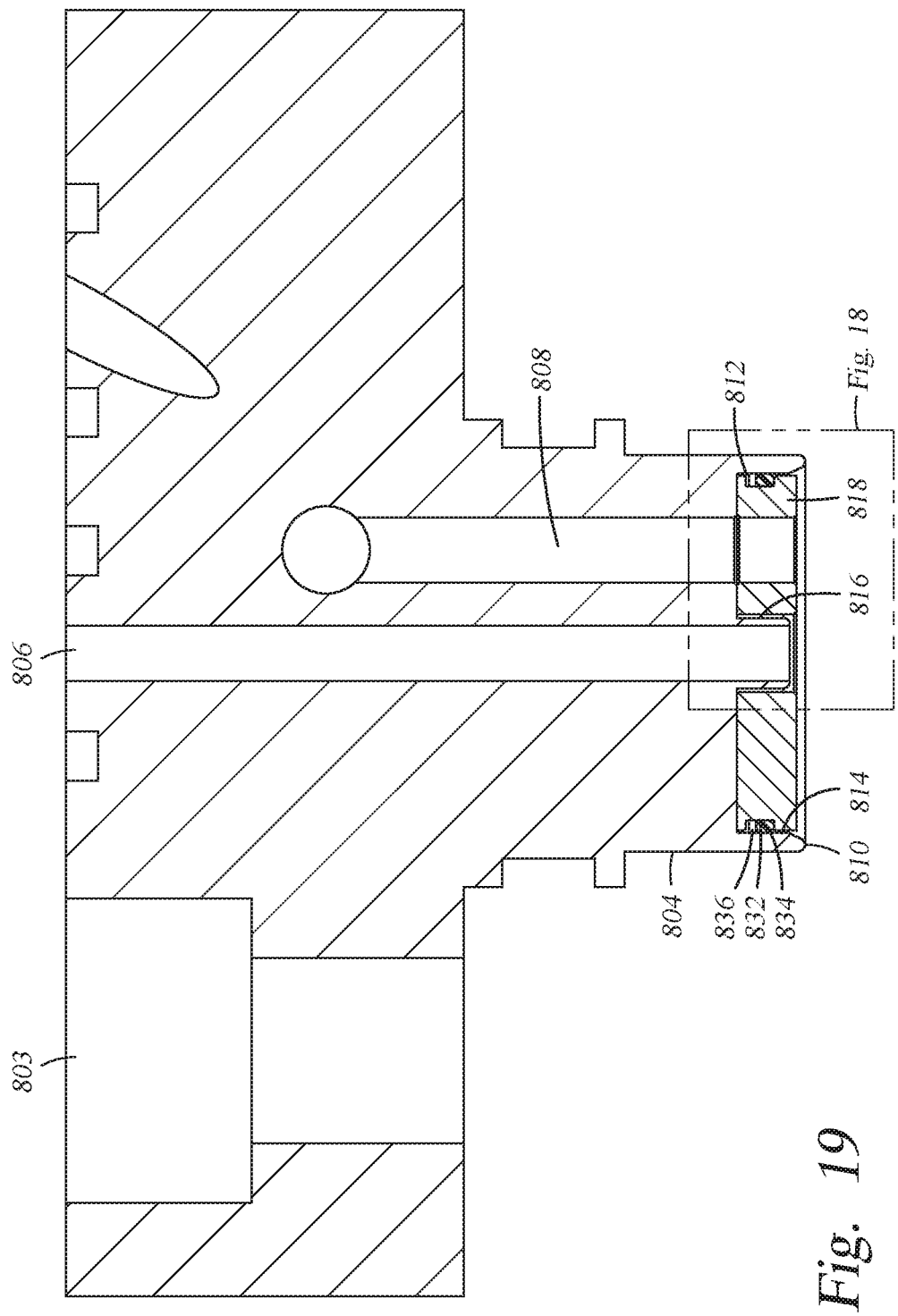
FIG. 19 is a sectional view of the seal plate carrier of FIG. 17.

Referring now to FIGS. 17 to 19, an alternative construct of a sealing plate carrier is shown. Here, sealing plate carrier 800 includes a generally rectangular body 802, with a nipple 804 extending therefrom. Rectangular body 802 includes a plurality of mounting apertures 803 extending therethrough, to receive a fastener to secure the sealing plate carrier 800 to the body of a valve. Here, the sealing plate carrier 800 includes two openings 806, 808 (FIG. 18) extending therein and through the nipple 802. The distal end 810 of the nipple 802 includes an annular recess 812 (FIG. 19) extending thereinto, which is radially bounded by an outer annular wall 814, an inner annular wall 816, and an annular base wall extending therebetween. An annular insert 818 composed of a single crystal or carbide material is received in the annular recess 812, with the annular base 822 thereof in contact with the annular base wall 824 of the recess 812. As with the other embodiments described herein, a compressible sleeve 826 of a material such as Delrin, PEEK, 30% carbon filled PEEK or Teflon® is located between the inner annular wall 816 and the inner wall 828 of the insert 818. The outer wall 830 of the insert 818 includes a seal ring groove 832 within which a sealing ring 834, such as an O-ring, and a backup ring 836 are provided to seal against the outer wall 814 of the annular recess 812. In use in a valve, the distal and face 840 faces one of the sealing elements of a shear seal assembly.

Annular insert 818 includes a central aperture 842 surrounding the inner wall 816 of the annular recess 812, which contacts the outer surface of the sleeve 826, and a second opening 838 aligned with flow passage 808. Flow passage 806 is surrounded by the inner wall 816 of the annular recess 812.

Figure 20:
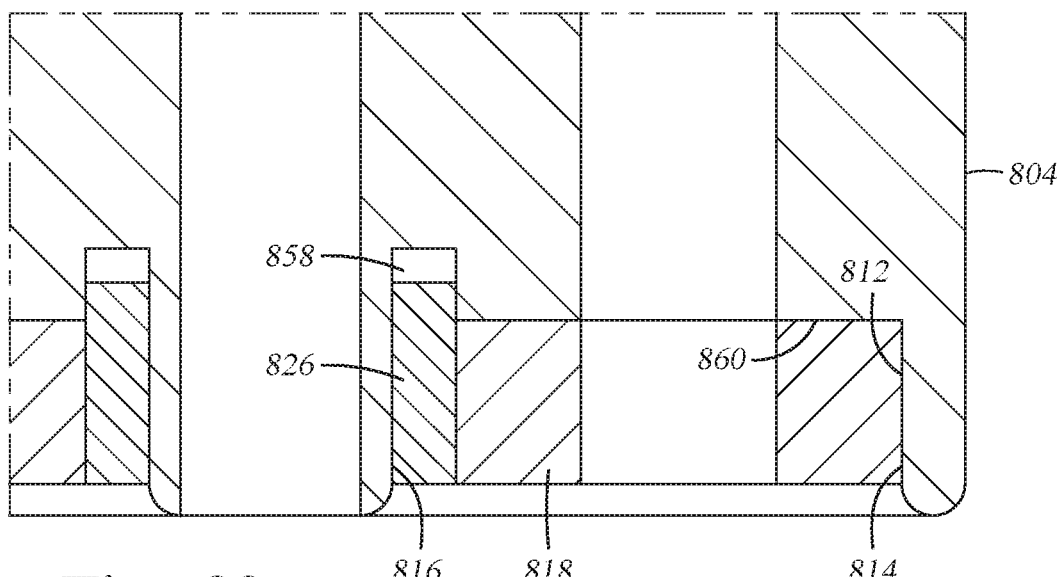
FIG. 20 is an alternate construct of the end of the nipple of the seal plate carrier of FIG. 17, showing the connection of a single crystal or carbide insert therein.

Referring to FIG. 20, an alternate construct of the annular recess 812 includes an annular slot 858 (recess) extending inwardly of the nipple 814 from the base wall 860 of the recess, directly adjacent to the inner wall 814. The width of the slot 858 in the direction between the inner and outer annular walls 814, 816 is slightly greater than the width of the compressible sleeve 826 in the direction between the inner and outer annular walls 814, 816. Thus, if during pressing of the insert 818 into the recess 812 the sleeve 826 moves inwardly of the recess, the annular slot 858 allows a portion of the body of the sleeve to move thereinto, and thereby prevent the portion of the sleeve 826 adjacent to the base wall 860 from being deformed in the direction of the outer wall 816 of the recess, and become pinched between the base of the insert 818 and the base wall 860 of the recess.

Figure 21:
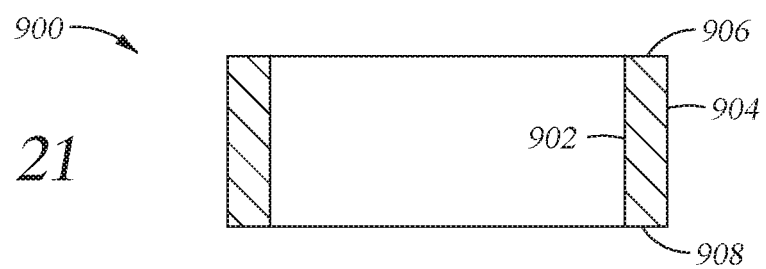
FIG. 21 is a sectional view of an insert used to connect an insert to a valve component.
Figure 22:
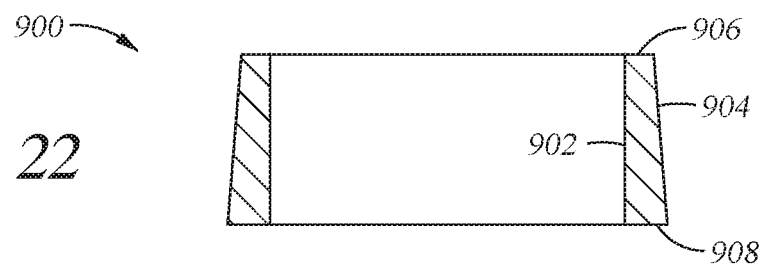
FIG. 22 is a sectional view of an insert used to connect an insert to a valve component.
Figure 23:
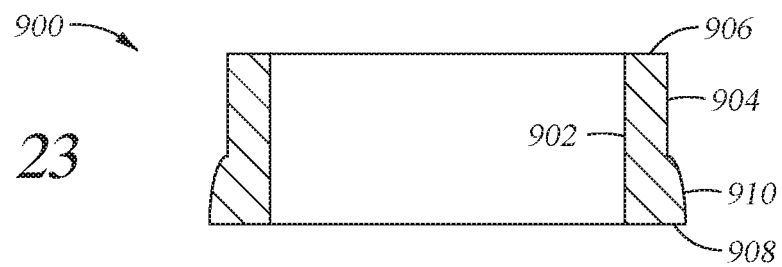
FIG. 23 is a sectional view of an insert used to connect an insert to a valve component.

Referring to FIGS. 21 to 23, different configurations of a compressible sleeve are shown. In FIG. 21, sleeve 900 has a generally right, annular, construct where the inner and outer side walls 902, 904 intersect with or meet the opposed annular end walls 906, 908 at a right angle. In FIG. 22, the inner side wall 902 intersects with or meets the opposed annular end walls 906, 908 at a right angle, but the inner and outer side walls 902, 906 are not parallel to one another, such that the end wall 908 disposed against the base of a recess when in use is wider than the other end wall 906. The angles of the inner and outer walls 902, 904 with respect to the end walls 906, 908 can be reversed, such that the inner wall 902 tapers inwardly of, or outwardly of, the opening in the sleeve 900 in the depth direction of the sleeve, assuming end wall 908 is abutting or facing the valve component on or in which the sleeve 900 is used. In FIG. 23, the inner side wall 902 intersects with or meets the opposed annular end walls 906, 908 at a right angle, the outer side wall meets the end wall 906 at a right angle, and a footing is provided integrally in the sleeve which provides a wider portion of the sleeve 900 adjacent to the end wall 908 disposed against the base of a recess when in use. As with the sleeve 900 of FIG. 22, the location on the footing 910 can be on either end of the outer wall, or on the inner wall, at either end thereof. When the footing 910 is located on the inner wall 902 adjacent to the end wall 908 disposed against the base of a recess when in use, the footing 901 provides a standoff of a known height further enabling relative motion between an insert and the underlying component on or in which the insert is positioned. Note, the sleeves as shown in FIGS. 22 and 23 are intended to be used where the inner wall of an annular single crystal or carbide insert is located over the outer wall 904 of the sleeve. Where the outer wall of the insert is received against the inner wall of the sleeve, such as show in FIGS. 1 to 4, the inner wall 902 of the sleeve would be further extend away from the outer wall 904 adjacent to the end wall 908 disposed against the base of a recess when in use than it does end wall 906.

While the foregoing is directed to embodiments of the present invention, other and further embodiments of the invention may be devised without departing from the basic scope thereof, and the scope thereof is determined by the claims that follow.

What is claimed is:

1. A shear seal, comprising:
a seal plate having a first seal surface; and
a sliding seal assembly having a second seal surface; wherein
at least one of the first and second seal surfaces comprise an insert connected to one of the seal plate and the sliding seal assembly, the insert when connected to the seal plate comprising a material different than that of the seal plate, and the insert when connected to the sliding seal assembly comprising a material different than that of the sliding seal assembly;
at least one compressed member, the compressed member, when the insert is connected to the seal plate, is disposed between the insert and an adjacent surface of seal plate and the compression of the compressed member provides sufficient force against adjacent surfaces of the insert and the compressed member to provide sufficient friction therebetween to prevent the insert from backing off or out of its connection location with the seal plate, and, when the insert is connected to the sliding seal assembly, the compressed member is disposed between the insert and an adjacent surface of the sliding seal assembly, and the compression of the compressed member provides sufficient force against adjacent surfaces of the insert and the compressed member to provide sufficient friction therebetween to prevent the insert from backing off or out of its connection location with the sliding seal assembly; and
a biasing member contacting a portion of the sliding seal assembly and biasing the sliding seal assembly against the seal plate.

2. The shear seal of claim 1, wherein the compressed member comprises an annular ring and the sliding seal assembly further comprises an annular recess having a first circumferential wall;
the compressed member is disposed between the insert and the annular wall; and
the insert includes a circumferential insert wall, the circumferential insert wall contacting the compressed member.

3. The shear seal of claim 2, wherein the compressed member comprises at least one of PEEK, carbon filled PEEK, or, Teflon or Delrin.

4. The shear seal of claim 1, wherein the insert comprises at least one of a single crystal material of a carbide.

5. The shear seal of claim 2, wherein the compressed member comprises a right annular ring.

6. The shear seal of claim 2, wherein the compressed member is an annular member having a non-uniform thickness in a radial direction thereof.

7. The shear seal of claim 2, wherein the insert is disposed in a recess of the seal plate; and
the compressed member contacts and extends circumferentially around the insert.

8. The shear seal of claim 1, wherein the insert is disposed over the sliding seal assembly and the sliding seal assembly further comprises an annular recess having a first circumferential wall and an annular ledge;
the compressed member is disposed between the insert and the first circumferential wall and between the annular ledge and the insert; and
the insert includes a circumferential inner insert wall, the circumferential inner insert wall contacting the compressed member.

9. The shear seal of claim 1, wherein the insert comprises at least one of a ruby or sapphire.

10. A fluid operated fluid circuit component comprising:
a shear seal, comprising:
a seal plate having a first seal surface; and
a sliding seal assembly having a second seal surface; wherein
at least one of the first and second seal surfaces comprise an insert connected to one of the seal plate and the sliding seal assembly, the insert when connected to the seal plate comprising a material different than that of the seal plate, and the insert when connected to the sliding seal assembly comprising a material different than that of the sliding seal assembly;
at least one compressed member, the compressed member, when the insert is connected to the seal plate, is disposed between the insert and an adjacent surface of seal plate and the compression of the compressed member provides sufficient force against adjacent surfaces of the insert and the compressed member to provide sufficient friction therebetween to prevent the insert from backing off or out of its connection location with the seal plate, and, when the insert is connected to the sliding seal assembly, the compressed member is disposed between the insert and an adjacent surface of the sliding seal assembly, and the compression of the compressed member provides sufficient force against adjacent surfaces of the insert and the compressed member to provide sufficient friction therebetween to prevent the insert from backing off or out of its connection location with the sliding seal assembly; and
a biasing member contacting a portion of the sliding seal assembly and biasing the sliding seal assembly against the seal plate.

11. The fluid operated fluid circuit component of claim 10, wherein the compressed member comprises an annular ring and the sliding seal assembly further comprises an annular recess having a first circumferential wall;
the compressed member is disposed between the insert and the annular wall; and
the insert includes a circumferential insert wall, the circumferential insert wall contacting the compressed member.

12. The fluid operated fluid circuit component of claim 11, wherein the compressed member comprises at least one of PEEK, carbon filled PEEK, or, Teflon or Delrin.

13. The fluid operated fluid circuit component of claim 10, wherein the insert comprises at least one of a single crystal material of a carbide.

14. The fluid operated fluid circuit component of claim 11, wherein the compressed member comprises a right annular ring.

15. The fluid operated fluid circuit component of claim 11, wherein the compressed member is an annular member having a non-uniform thickness in a radial direction thereof.

16. The fluid operated fluid circuit component of claim 11, wherein the insert is disposed in a recess of the seal plate; and
the compressed member contacts and extends circumferentially around the insert.

17. The fluid operated fluid circuit component of claim 10, wherein the insert is disposed over the sliding seal assembly and the sliding seal assembly further comprises an annular recess having a first circumferential wall and an annular ledge;
    the compressed member is disposed between the insert and the first circumferential wall and between the annular ledge and the insert; and
    the insert includes a circumferential inner insert wall, the circumferential inner insert wall contacting the compressed member.

18. The fluid operated fluid circuit component of claim 10, wherein the insert comprises at least one of a ruby or sapphire.

19. The fluid operated fluid circuit component of claim 10, wherein the component comprises one of a valve or a pressure regulator.

20. A shear seal assembly comprising:
    a seal plate having a first sliding seal engagement surface;
    a sliding seal assembly, comprising a body having a biasing element surface end and a second sliding seal engagement surface, the second sliding seal engagement surface on the opposite side of the body from the biasing element surface,
    at least one of the seal plate and body including a recess therein, the recess including a circumferential recess wall;
    a compressed member having a compressible member body, a first cylindrical surface and a second cylindrical surface, the first cylindrical surface on an opposite side of the compressible member body from the second cylindrical surface;
    an insert having a circumferential insert wall, the insert located in the recess, wherein the circumferential insert wall of the insert contacts one of the first cylindrical surface and the second cylindrical surface and the other of the first cylindrical surface and the second cylindrical surface contacts the circumferential recess wall; and
    the contact between the insert and the compressed member provides sufficient force against the adjacent surfaces of the insert and the compressed member to provide sufficient friction therebetween to prevent the insert from backing off or out the recess.

* * * * *